US007944643B1

(12) United States Patent
Jiang et al.

(10) Patent No.: US 7,944,643 B1
(45) Date of Patent: May 17, 2011

(54) PATTERNS FOR PRE-FORMATTED INFORMATION ON MAGNETIC HARD DISK MEDIA

(75) Inventors: Wen Jiang, Fremont, CA (US); David E. Wachenschwanz, Saratoga, CA (US); Paul C. Dorsey, Sunnyvale, CA (US); David Treves, Palo Alto, CA (US)

(73) Assignee: WD Media, Inc., San Jose, CA (US)

( * ) Notice: Subject to any disclaimer, the term of this patent is extended or adjusted under 35 U.S.C. 154(b) by 424 days.

(21) Appl. No.: 11/950,570

(22) Filed: Dec. 5, 2007

(51) Int. Cl.
G11B 5/596 (2006.01)

(52) U.S. Cl. .................................... 360/77.02
(58) Field of Classification Search ............... 360/77.02, 360/77.05, 77.07, 77.08, 78.14, 78.04
See application file for complete search history.

(56) References Cited

U.S. PATENT DOCUMENTS

| | | | | |
|---|---|---|---|---|
| 4,549,232 A * | 10/1985 | Axmear et al. | ............ | 360/77.07 |
| 4,698,523 A * | 10/1987 | Gershon et al. | ................ | 327/61 |
| 4,912,585 A | 3/1990 | Belser et al. | | |
| 5,047,880 A * | 9/1991 | Ohno | ......................... | 360/78.14 |
| 5,095,393 A * | 3/1992 | Janz | ........................... | 360/77.05 |
| 6,086,961 A | 7/2000 | Bonyhard | | |
| 6,088,200 A | 7/2000 | Morita | | |
| 6,139,936 A | 10/2000 | Weiss | | |
| 6,153,281 A | 11/2000 | Meyer et al. | | |
| 6,369,974 B1 * | 4/2002 | Asgari et al. | .............. | 360/78.14 |
| 6,510,015 B2 | 1/2003 | Ellis et al. | | |
| 6,563,673 B2 | 5/2003 | Mundt et al. | | |
| 6,614,614 B1 * | 9/2003 | Murayama et al. | ........ | 360/77.02 |
| 6,738,207 B1 | 5/2004 | Belser | | |
| 6,751,035 B1 | 6/2004 | Belser | | |
| 6,753,043 B1 | 6/2004 | Kuo et al. | | |
| 6,754,017 B2 | 6/2004 | Rettner et al. | | |
| 6,821,627 B2 | 11/2004 | Stirniman et al. | | |
| 7,119,975 B2 | 10/2006 | Blaum et al. | | |
| 7,236,325 B2 | 6/2007 | Albrecht et al. | | |
| 7,262,931 B2 | 8/2007 | Nakamura et al. | | |
| 7,438,982 B2 * | 10/2008 | Suwa et al. | .................... | 428/826 |
| 7,505,220 B2 * | 3/2009 | Soeno et al. | ..................... | 360/16 |
| 7,532,423 B2 * | 5/2009 | Kaizu et al. | ..................... | 360/48 |
| 7,548,388 B2 * | 6/2009 | Kaizu et al. | ..................... | 360/48 |
| 7,562,270 B2 * | 7/2009 | Andoh | ......................... | 714/723 |
| 2006/0176606 A1 * | 8/2006 | Soeno et al. | ............... | 360/77.08 |
| 2006/0222897 A1 | 10/2006 | Kamata et al. | | |
| 2007/0096678 A1 * | 5/2007 | Melrose | ....................... | 318/652 |
| 2007/0097540 A1 | 5/2007 | Asakura | | |
| 2007/0211368 A1 | 9/2007 | Shibano et al. | | |
| 2007/0242387 A1 | 10/2007 | Kawabe | | |

OTHER PUBLICATIONS

S.E. Lambert et al., "Beyond Discrete Tracks: Other Aspects of Patterned Media," J. Appl. Phys. 69(8): Apr. 1991, pp. 4724-4726.
James Bain et al., "High-Density Magnetic Recording and Integrated Magneto-Optics: Materials and Devices", Materials Research Society Symposium Proceedings, vol. 517, 1998, pp. 1-2.
Yoshikazu Soeno, et al., "Feasibility of Discrete Track Perpendicular Media for High Track Density Recording", IEEE Transactions on Magnetics, vol. 39, Issue 4, Jul. 2003, pp. 1967-1971.
Tomoyoshi Yamada, et al., "Servo Track Writing Technology", Fujitsu Sci. Tech. J., vol. 42, Issue 1, Jan. 2006, pp. 93-102.

* cited by examiner

Primary Examiner — Fred Tzeng

(57) ABSTRACT

A magnetic disk media is physically preformatted to have a non-user data area providing any of a servo pattern, a gray code pattern and a timing line pattern. The non-user data area patterns are preformatted to have non-recordable regions with a radial width that is always less than the track pitch of the data area. In exemplary implementations, servo patterns, gray code patterns and timing line patterns are physically preformatted to have a recordable:non-recordable radial width ratio substantially equal to that of a user data area. In certain embodiments, non-magnetic or magnetically suppressed regions having cross-track dimension substantially equal to that of spaces between tracks in the user data area are consecutively offset in a cross-track direction from the discrete track recording pattern of the user data area.

25 Claims, 17 Drawing Sheets

PATTERNS FOR PRE-FORMATTED INFORMATION ON MAGNETIC HARD DISK MEDIA

TECHNICAL FIELD

Embodiments described herein relate to the field of recording disks and, more particularly, to pre-formatting recording disk magnetic media.

BACKGROUND

A disk drive system includes one or more magnetic recording disks and control mechanisms for storing data on the disks. The trend in the design of magnetic hard disk drives is to increase the recording density of a disk drive system. Recording density is a measure of the amount of data that may be stored in a given area of a disk. Achieving higher areal density (i.e., the number of stored bits per unit surface area) requires that the data tracks be closer to each other. Also, as the track widths are made smaller, misregistration of a track more often affect the writing and/or reading with the head by an adjacent track. This behavior is commonly referred to as adjacent track interference (ATI). One method for addressing ATI is to pattern the surface of the disk to form discrete data tracks, referred to as discrete track recording (DTR).

Conventional DTR structures have been described, for example, by Morita in U.S. Pat. No. 6,088,200 and Mundt et al. in U.S. Pat. No. 6,563,673. FIG. 1 depicts a conventional DTR structure 100 utilizing a pattern of concentric discrete magnetic regions 111 and 112 as the recording medium. The discrete magnetic regions 111 and 112 are disposed on areas of a non-magnetic substrate 105. The substrate surface areas 105 not containing the magnetic material separate the discrete magnetic regions 111 and 112 from one another by the cross-track or radial width, $S_{trough}$, to form concentric data tracks having a track pitch, $P_{track}$, in the user data area 110. As shown, the track pitch, $P_{track}$, is the sum of the cross-track width of the discrete magnetic region 112 and the cross-track width of the separation between the adjacent discrete magnetic region 111. Thus, the track pitch, $P_{track}$, is a useful dimension for characterizing the concentric physical data track pattern of a particular DTR disk.

The cross-track width is typically less than the width of the recording head such that, during operation, portions of the head extend over the non-magnetic regions 105, which may be implemented as spaces, troughs, valleys, grooves, etc., as the head flies over the disk on an air bearing sufficiently close to a discrete magnetic region, which may be implemented as hills, elevations, etc., to enable the writing of data in a particular track. Therefore, with DTR, data tracks are defined both physically and magnetically.

Because a head must fly over a particular track in the down-track direction during operation, it is important to accurately measure the position of the head periodically. FIG. 1 further depicts a conventional means for making such a determination by physically defining a non-user data area 101, in the DTR media. The non-user data area 101 typically includes timing, address alignment and other control information used by the disk drive system. Thus, the non-user data area 101 will generally include a timing line pattern comprising lands, such as the timing land 120, a gray code pattern comprising lands, such as the gray code land 125 and a servo pattern comprising lands, such as the servo land 130. Each of timing land 120, gray code land 125 and servo land 130 is physically defined with a relative alignment to the data tracks in the user data area 110. As shown, surrounding each of the timing land 120, gray code land 125 and servo land 130, is the non-magnetic trough 105.

However, conventional control sector patterns, such as those shown in the non-user data area 101, have a number of shortcomings. First, the very large cross-track width of troughs and lands is problematic for the electron beam patterning techniques typically employed at least once in the fabrication process, usually for the patterning of a master disk. As shown, each of the timing land 120, gray code land 125 and servo land 130 have a cross-track width at least as great as the track pitch, $P_{track}$ and may be many times the track pitch, $P_{track}$. Conventionally, an electron beam "writes" on regions that are precursors to regions of a non-magnetic substrate 105. During such writing, an electron beam having a dimension $S_{trough}$ defines the space between data tracks to have the dimension, $S_{trough}$. However, because the dimension of the electron beam, $S_{trough}$, is generally fixed during the writing process, patterning the much larger cross-track widths of the non-magnetic substrate 105 surrounding the timing land 120, gray code land 125 and servo land 130, the electron beam with the $S_{trough}$ dimension requires "stitching" together a plurality of electron beam pixel patterns written individually. This stitching process can cause significant patterning errors when each individual pattern is not perfectly aligned with another. This type of patterning error can degraded the function of the timing land 120, gray code land 125 and servo land 130. Furthermore, writing one pixel at a time to such a relatively large area can significantly affect the total time required to form a pre-formatting pattern.

The conventional patterns depicted in FIG. 1 may also be difficult to physically define in a magnetic media with an imprinting operation. Conventional imprinting operations typically must compress a material located in the non-magnetic region 105. Such compression generally requires a pattern providing a pathway for compressed material to extrude. As shown in FIG. 1, because of the large cross-track width of the timing land 120 and gray code land 125, the non-magnetic region 105 between these two lands has no such pathway. Thus, the conventional patterns disadvantageously hinder the imprinting process.

The difference in pattern density between the servo area 101 and the user data area 110 is yet another disadvantage of conventional patterns. Pattern density transitions between regions can disadvantageously cause perturbations in the head as it flies between the regions during operation of the disk drive system. As shown in FIG. 1, the user data area 110 has a consistent pattern density defined by the track pitch, $P_{track}$, while the non-user data area 101 has much less consistency and includes patterns having a cross-track width much larger than $P_{track}$. These characteristics may perturb the flight of a disk drive slider. Conventional non-user data patterns however, are limited to controlling only the down-track or circumferential lengths of the lands and troughs to mitigate the effects of pattern density variation on a slider.

BRIEF DESCRIPTION OF THE DRAWINGS

Embodiments are illustrated by way of example, and not limitation, in the figures of the accompanying drawings in which.

DETAILED DESCRIPTION

Embodiments of DTR patterns and there fabrication are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known fabrication processes and integration techniques have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Figure 1:
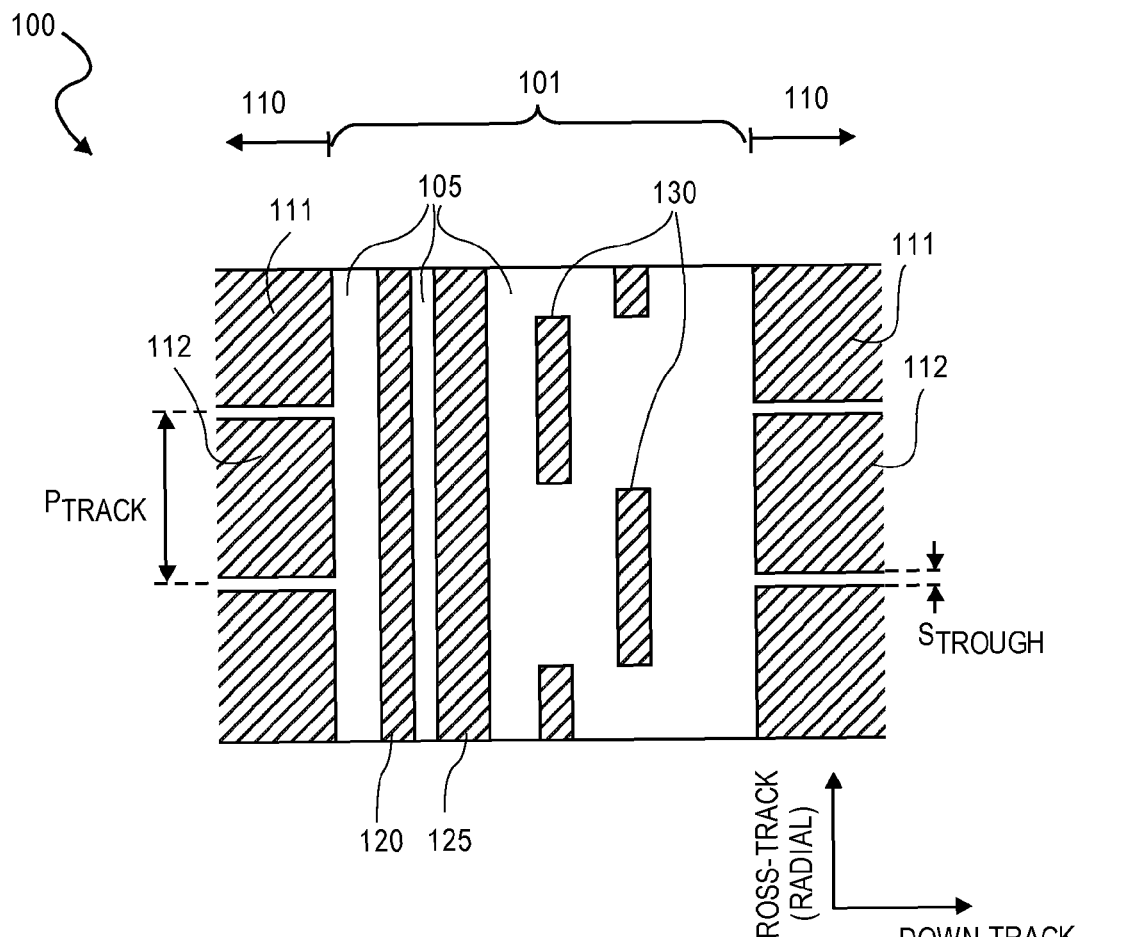
FIG. 1 illustrates a magnetic media recording disk with discrete tracks and conventional servo patterns.
Figure 2:
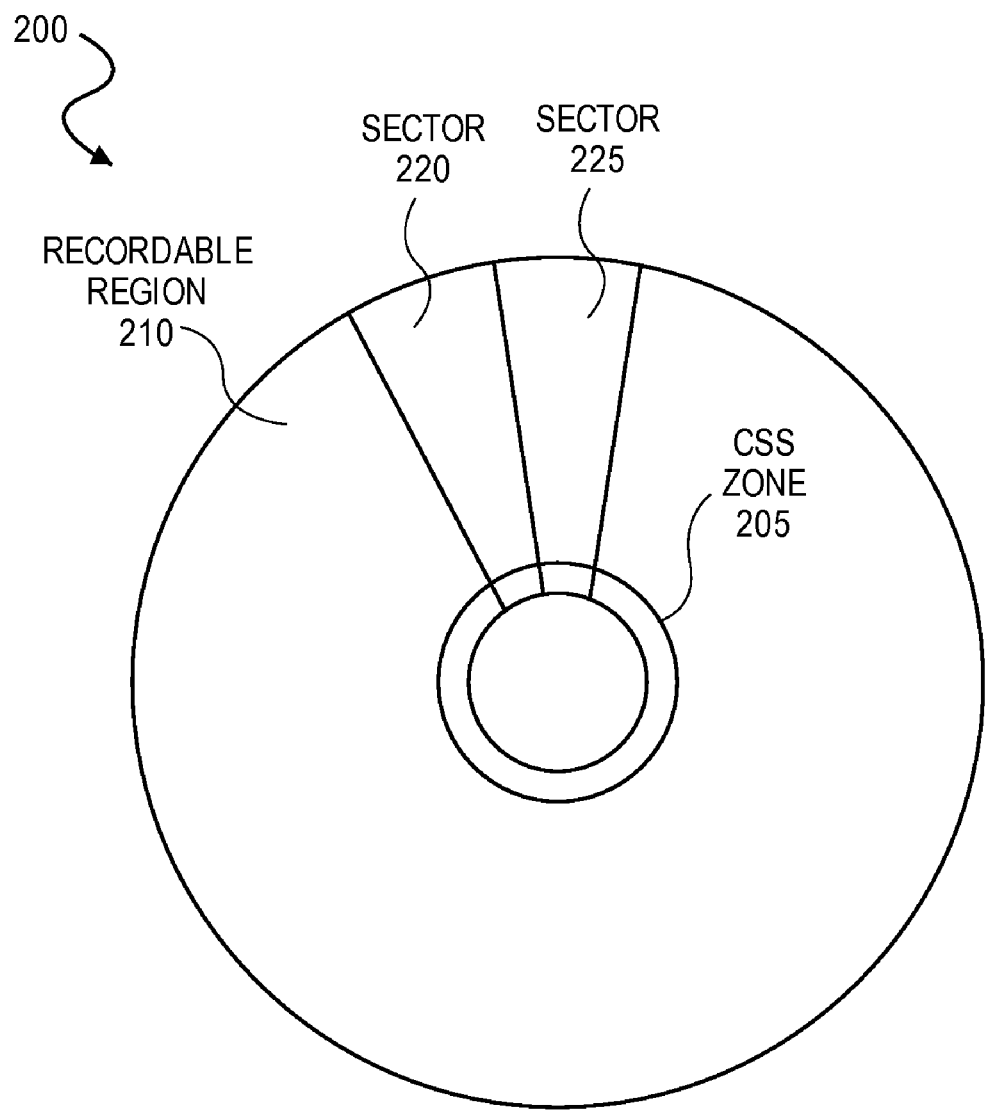
FIG. 2 illustrates a magnetic media recording disk physically preformatted to have discrete tracks and discrete servo patterns according to one embodiment.

In certain embodiments, a magnetic media is patterned for applications such as discrete track recording (DTR) including both longitudinal magnetic recording (LMR) disks and perpendicular magnetic recording (PMR) disks that are either single sided are doubled sided. The DTR may further include continuous data tracks or discrete bit tracks. FIG. 2 illustrates a magnetic media recording disk 200 with a major surface including a contact stop start (CSS) zone 205 and a useable recording region 210. In one embodiment, recording disk 200 has a diameter of approximately 85 mm. A number of arc-shaped sectors 220 and 225 are physically preformatted on the magnetic media recording disk 200. While only two are depicted for illustration purposes, it is understood that there may be hundreds of such sectors formed on the magnetic media recording disk 200 to improve head tracking during each rotation of the disk. Furthermore, sectors 220 and 225 need not only extend radially as shown, but may be arced and/or otherwise irregularly spaced.

Figure 3:
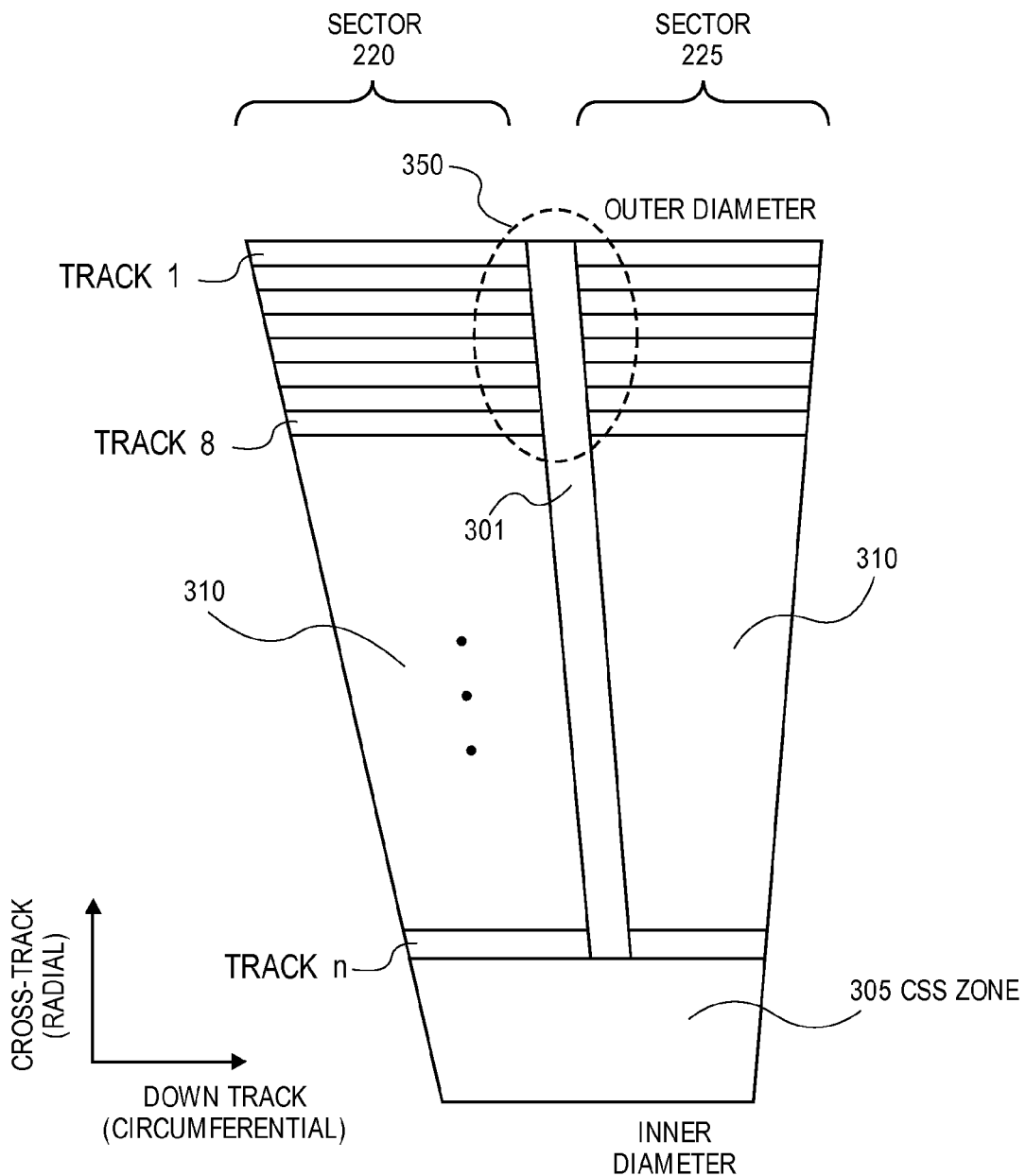
FIG. 3 is a plan view illustrating an expanded view of a portion of the magnetic media recording disk illustrated in FIG. 2.

FIG. 3 is a plan view illustrating an expanded view of the sectors 220 and 225 depicted in the magnetic media recording disk illustrated in FIG. 2. The sectors of FIG. 3 include a user data area 310 on either side of a non-user data area 301. The user data area 310 further includes (n) concentric data tracks spanning the radial or cross-track distance between the CSS zone 305 and outer diameter of the disk. During operation, the user data area 310 is utilized to for storage of user data as the disk drive head flies down a track, such as track 1, in the down-track direction. In certain embodiments, the non-user data area 301 includes physically preformatted timing, address and drive head alignment information. Physically pre-formatting the non-user data area 301 entails defining, in the magnetic media, a physical pattern rather than merely electromagnetically writing/erasing the magnetic media. Because the physical pattern is formed during the manufacture of the magnetic media disk prior to incorporating the disk into a disk drive, the physical pattern is referred to as a "pre-formatted" pattern. Portion 350 is further expanded in FIGS. 4A, 5A and 6 to illustrate the physically preformatted patterns of particular embodiments of the present invention.

As used herein, the term "non-recordable" should be understood to encompass "non-magnetic" or "magnetically suppressed" regions physically defined in the recording media. Generally, the magnetic recording media may be physically defined with any type of non-recordable region commonly known in the art. For example, a physically preformatted non-recordable pattern may include a trough in the magnetic media.

In one embodiment of the present invention, a magnetic disk media, such as magnetic media recording disk 200, is physically preformatted such that a non-user data area includes recordable and non-recordable regions and wherein all non-recordable regions in the non-user data area have a radial width that is less than the track pitch.

In certain embodiments described herein, the radial width of the non-recordable region may be made approximately equal between a physically preformatted user data area and a physically preformatted a non-user data area. In exemplary implementations, servo patterns, gray code patterns and timing line patterns are physically preformatted to have a radial width ratio approximately equal to non-recordable regions defining track spaces in a user data area. In other words, the non-recordable regions within the non-user data area 301 have a radial or cross-track dimension equal to the radial or cross-track dimension of non-recordable regions within a track pitch of the user data area 310. In certain embodiments, the non-recordable regions are offset, in a radial or cross-track direction, by less than the track pitch from the discrete track recording pattern of the user data area 310. In further embodiments, the non-recordable regions in the non-user data area 301 are consecutively offset, in a radial or cross-track direction, by an amount equal to the radial or cross-track width of the non-recordable region, from the discrete track recording pattern of the user data area 310.

Figure 4A:
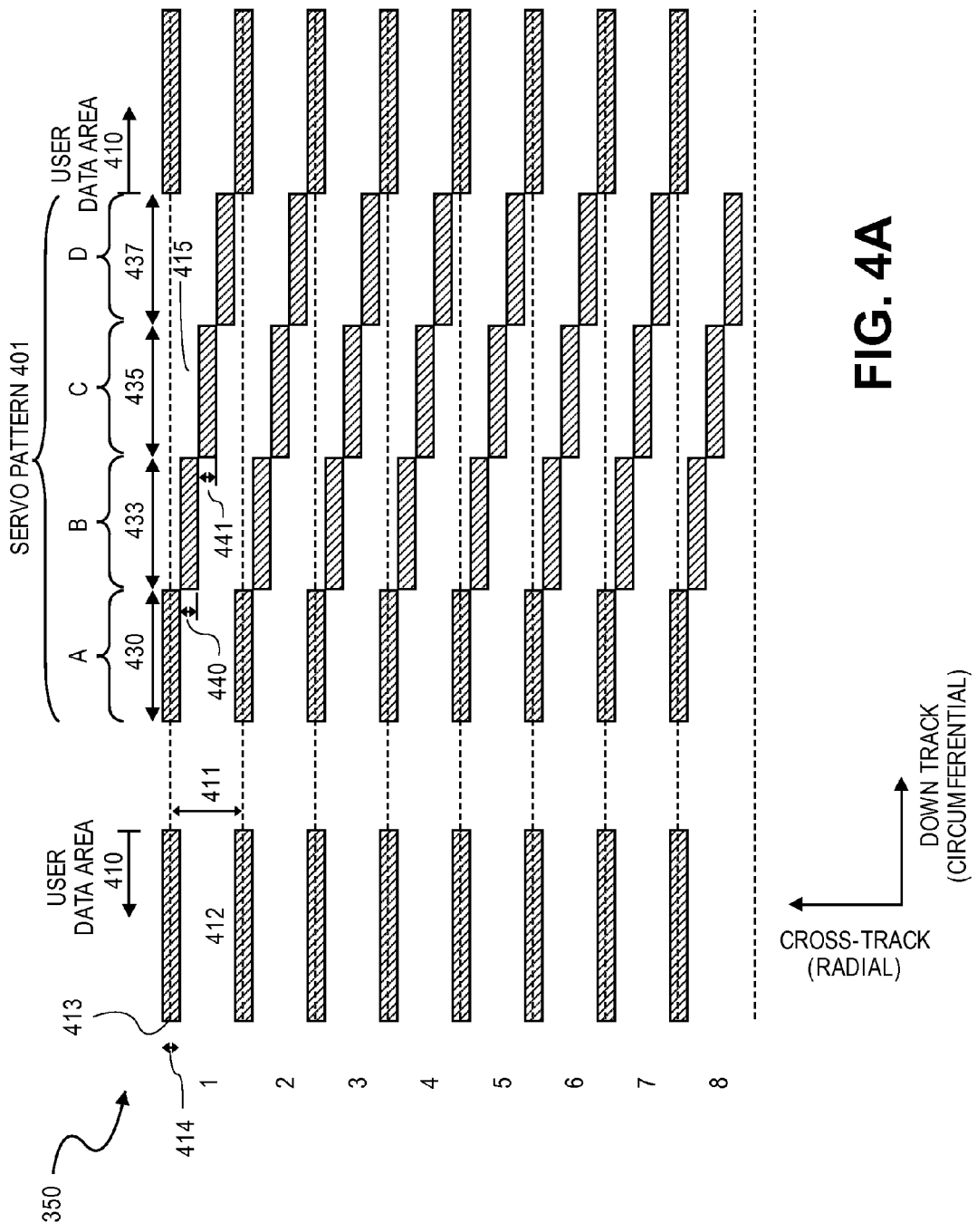
FIG. 4A is a plan view illustrating an expanded view of a portion of the magnetic media recording disk illustrated in FIG. 3 to show a servo pattern according to one embodiment.

FIG. 4A is a plan view illustrating an expanded view showing a servo pattern according to one embodiment. As shown, the user data area 410 includes eight data tracks demarked for illustration purposes by dashed lines in the down-track direction. Each data track, such as the data track 1, has a track pitch 411 spanning the cross-track distance in a radial direction between the illustrative dashed lines. The track pitch 411 is equal to the sum of the radial width or cross-track width of the magnetic region 412 and the radial width or cross-track width of the non-recordable track space 413. The non-recordable track space 413 has a radial width or cross-track width 414. Generally, the cross-track width 414 may be any desired width and typically anywhere from 5% to 75% of the track pitch 411, and is preferably less than 50% of the track pitch 411. In the particular embodiment depicted in FIG. 4A, the cross-track width 414 of the non-recordable track space 413 is approximately 25% of the track pitch 411 for a recordable: non-recordable radial width ratio of 3:1. In other embodiments the recordable:non-recordable radial width ratio may be 2:1 (e.g. the non-magnetic or magnetically suppressed region is equal to approximately 33% of the track pitch), 1:1 (i.e. the non-magnetic or magnetically suppressed region is equal to 50% of the track pitch) or even smaller. The recordable:non-recordable radial width ratio is herein defined as the ratio of the radial width of the magnetic portion to the radial width of the non-magnetic or non-magnetic portion across a track pitch. Similarly, for DTR embodiments having discrete bit patterned in the user data area, the recordable:non-recordable radial width ratio refers to the ratio of the radial width of the magnetic bit block portion of the track pitch to the radial width of the non-magnetic or magnetically suppressed portion of the track pitch. Thus, in certain embodiments described herein where the non-recordable regions in the non-user data area have the same radial width as the non-recordable regions in the user data area, the recordable:non-recordable radial width ratio may be made approximately equal between a physically preformatted user data area and a physically preformatted a non-user data area.

Adjacent to the user data area 410, is a non-user data area comprising a servo pattern 401. Generally, the servo pattern 401 includes the four staggered non-magnetic or magnetically suppressed regions A, B, C and D for each track, such as the track 1. Non-recordable regions A, B, C and D provide a pattern of burst separators between the surrounding magnetically recordable regions 415. During operation of a disk drive system, a recording head passing over these shifted non-recordable regions A, B, C and D provide servo information to keep the head on track.

In an embodiment, non-recordable regions A, B, C and D are consecutively shifted by a cross-track offset of less than the track pitch 411. In certain embodiments, each non-magnetic or magnetically suppressed region is consecutively shifted by an amount no greater than 50% of the track pitch 411. In the particular embodiment depicted in FIG. 4A, each non-magnetic or magnetically suppressed region is consecutively shifted by 25% of the track pitch 411. As depicted, the region A spans a first down-track length 430 in a circumferential direction, has a cross-track width less than the track pitch 411 and is not offset from the non-recordable track space 413 in the user data area 410. The region B spans a second down-track distance 430, has the cross-track width 440 and is offset from the non-recordable track space 413 by 25% of the track pitch 411 (or by 25% from the adjacent region A). The region C spans a third down-track distance 435, has a cross-track width 441 and is offset from the non-recordable track space 413 by 50% of the track pitch 411 (or by 25% from the adjacent region B). Similarly, region D spans a fourth down track distance 437 and is offset from the non-recordable track space 413 by 75% of the track pitch 411 (or by 25% from the adjacent region C).

The down-track lengths (i.e. circumferential lengths) of regions A, B, C and D may be any suitable length. In a particular embodiment, the down-track length of each region A, B, C and D may be optimized to minimize the total down-track length of the servo pattern 401 while providing sufficient signal duration to resolve the bursts at a given rate of disk rotation. In one embodiment, not shown, the down-track length of each region is equal to the cross-track width of the region. In another embodiment, the down-track length of each non-recordable region is at least an order of magnitude larger than the cross-track width of the non-recordable region.

In an embodiment, each non-magnetic or magnetically suppressed region A, B, C and D has a cross-track width less than the track pitch 411. In certain other embodiments, each non-magnetic or magnetically suppressed region has a cross-track width no greater than half the track pitch 411 for a recordable:non-recordable radial width ratio of at least 1:1. In certain other embodiments, each non-recordable region A, B, C, D has a cross-track width equal to that of the non-recordable track space 413. In the particular embodiment depicted in FIG. 4A, each region has a cross-track width equal to 25% of the track pitch 411 for a recordable:non-recordable radial width ratio of 3:1 in the servo pattern 401 that is equal to the 3:1 recordable:non-recordable radial width ratio in the user data area 410.

Both the limited cross-track width of each non-magnetic or magnetically suppressed region as well as the consistency in the recordable:non-recordable radial width ratio may advantageously reduce aerodynamic perturbation of a head flying over the servo pattern 401 for implementations where the non-magnetic or magnetically suppressed region is a pit in the surface of the magnetic media. For example, head flight is not greatly hindered as the head passes over non-magnetic or magnetically suppressed region B because the 25% of the track pitch that is transitioned from magnetic to non-magnetic or magnetically suppressed is balanced by the concurrent elimination of the non-magnetic or magnetically suppressed regions between the data tracks in the user data area 410. Where the recordable:non-recordable radial width ratio is substantially the same between the user data area 410 and servo pattern 401, the radial width of the leading edge of the head is confronted with a nearly constant ratio of lands and pits. As discussed elsewhere herein, embodiments with a substantially constant recordable:non-recordable radial width ratio may be sequentially written with a single electron beam pass. In a further embodiment, where the cross-track width of each region is equal to the cross-track width 414 of the non-recordable track space 413, a single electron beam pass may be advantageously employed to write both the user data area 410 and the servo pattern 401 without requiring stitching of any feature in the servo pattern 401. Also because of the limited cross-track width of the non-magnetic regions in the servo pattern 401, imprinting methods, as discussed elsewhere herein are advantageously simplified.

Figure 4B:
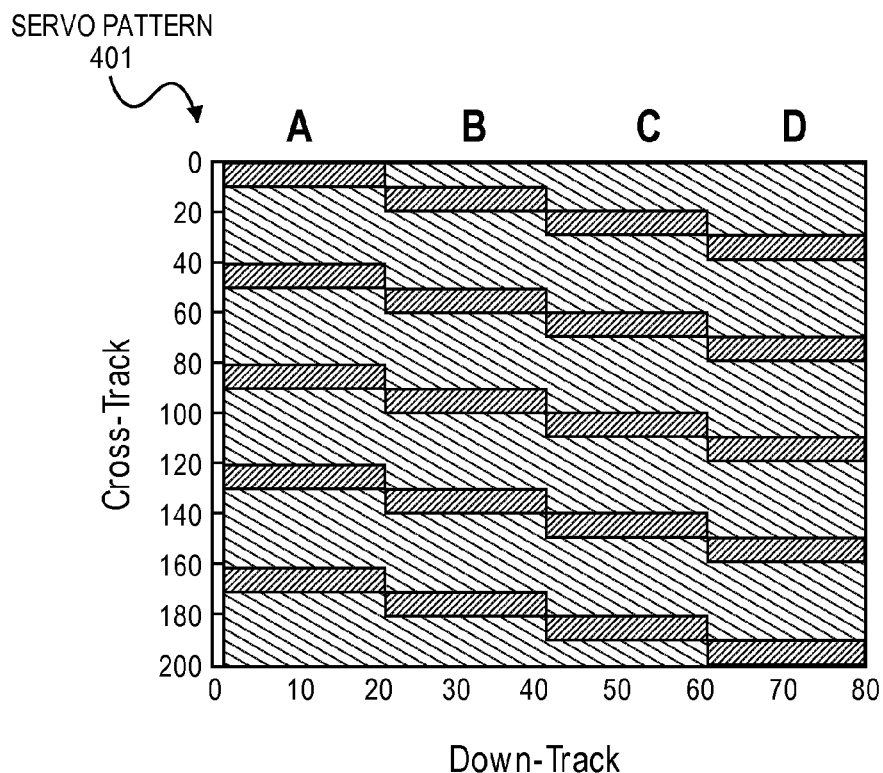
FIG. 4B is a plan view illustrating a servo pattern with non-magnetic or magnetically suppressed regions having a cross-track width equal to 25% of the user data area track pitch, according to one embodiment.
Figure 4C:
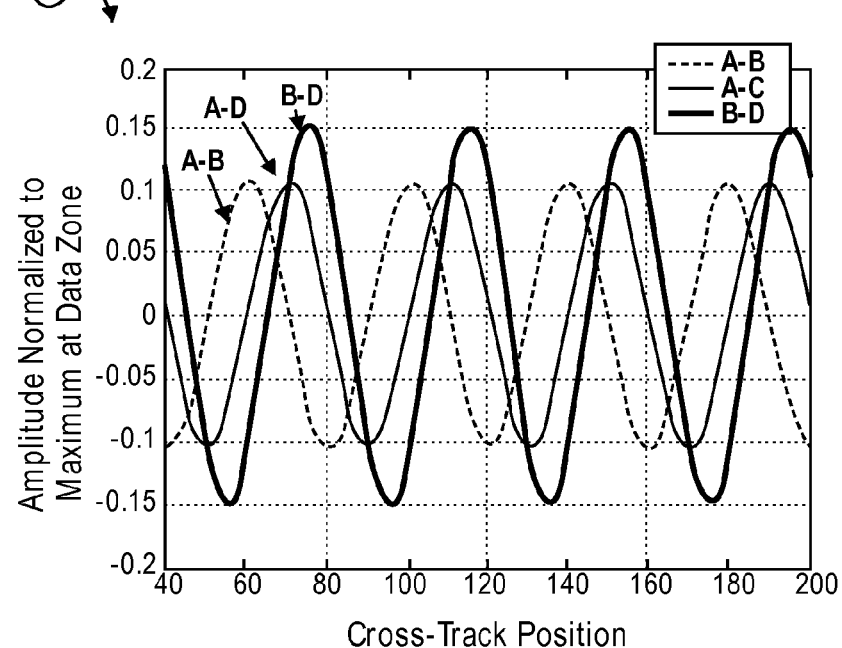
FIG. 4C is a graph illustrating read-back signals simulated for the servo pattern illustrated in FIG. 4B.

Position error signals (PES) may be determined in any desired manner from the servo pattern. For example, the position error signal may be determined with commonly known PES_N and PES_Q formulas. FIG. 4B is a plan view illustrating a servo pattern 401 with non-magnetic or magnetically suppressed regions having a cross-track width equal to 25% of the user data area track pitch for a recordable:non-recordable radial width ratio of 3:1, according to one embodiment. As an illustration of the functionality of the servo pattern depicted in FIG. 4B, differential read-back signals A-B, A-D and B-D are plotted in the graph 491 of FIG. 4C. The amplitude of the differential signals is normalized to a maximum within the user data area 410 of FIG. 4A. Notably, over the simulated track pitch of 40, the magnitude of the differential signals change in magnitude by at least +/−10%-15%. As shown, the differential signal B-D as a function of cross-track position resembles conventional servo patterns, being most sensitive at the center of the groove and not clearly distinguishing between even and odd tracks. Differential signals A-B and A-D distinguish left from right off-track positions. As shown, A-B is the most sensitive with a positive slope occurring at the left edge of a land (relative to a down-track direction) while A-D is most sensitive with a negative slope occurring at right edge of a land (relative to a down-track direction).

Figure 4D:
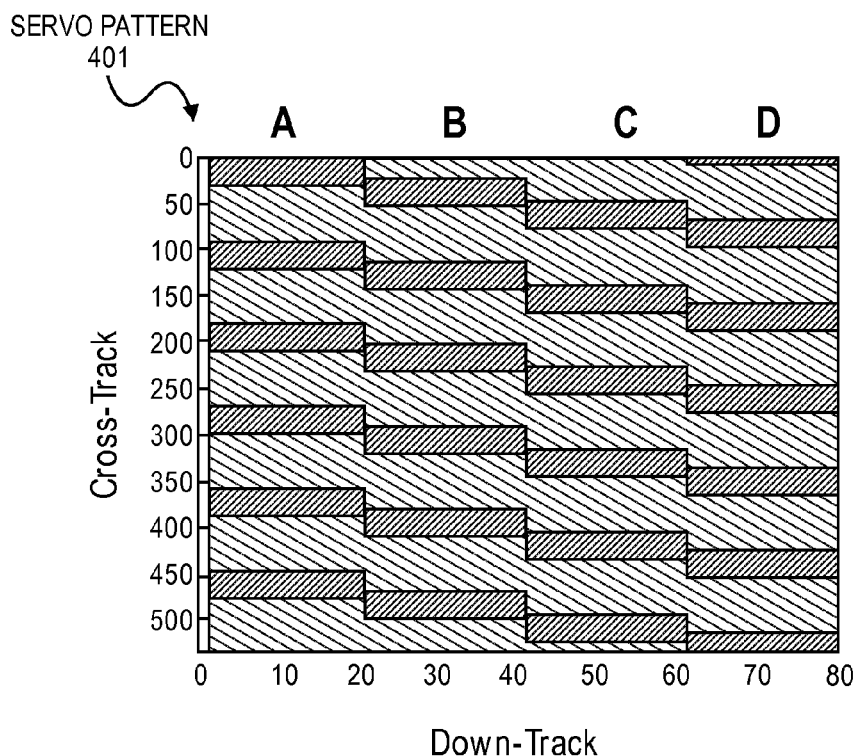
FIG. 4D is a plan view illustrating a servo pattern with non-magnetic or magnetically suppressed regions having a cross-track width equal to 33% of the user data area track pitch, according to one embodiment.
Figure 4E:
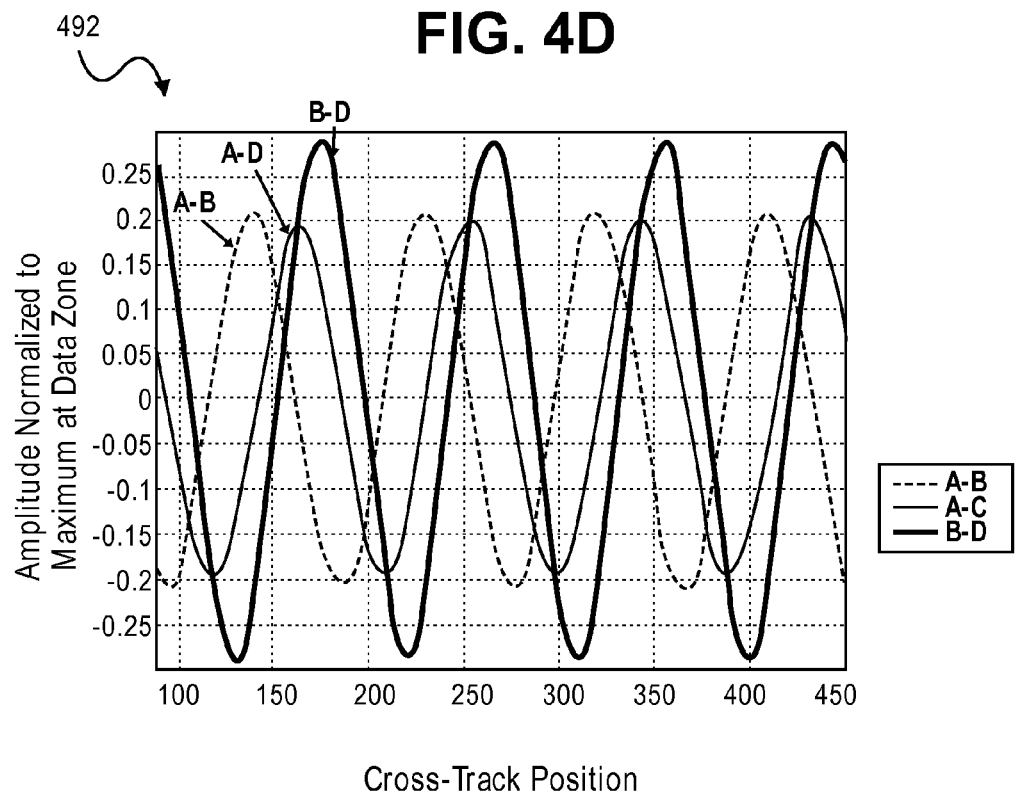
FIG. 4E is a graph illustrating read-back signals simulated for the servo pattern illustrated in FIG. 4D.

In another embodiment, as shown in FIG. 4D, the cross-track width of the non-magnetic or magnetically suppressed region in the servo pattern 401 is increased to approximately 33% of the track pitch 411 of FIG. 4A for a recordable:non-recordable radial width ratio of 2:1. As shown, the cumulative cross-track width of the magnetic regions is reduced to approximately 66%. As discussed elsewhere herein, such an embodiment may be advantageous where the track space in the data area 410 is also approximately 33% of the track pitch 411. FIG. 4E depicts a graph 492 illustrating differential read-back signals simulated for the servo pattern illustrated in FIG. 4D. The normalized amplitude, varying between +/−20-25% is relatively higher than for embodiments employing non-magnetic or magnetically suppressed region having a cross-track width of approximately 25%, reflecting the relatively larger area of the non-magnetic or magnetically suppressed regions providing greater separation between magnetic bursts.

Figure 5A:
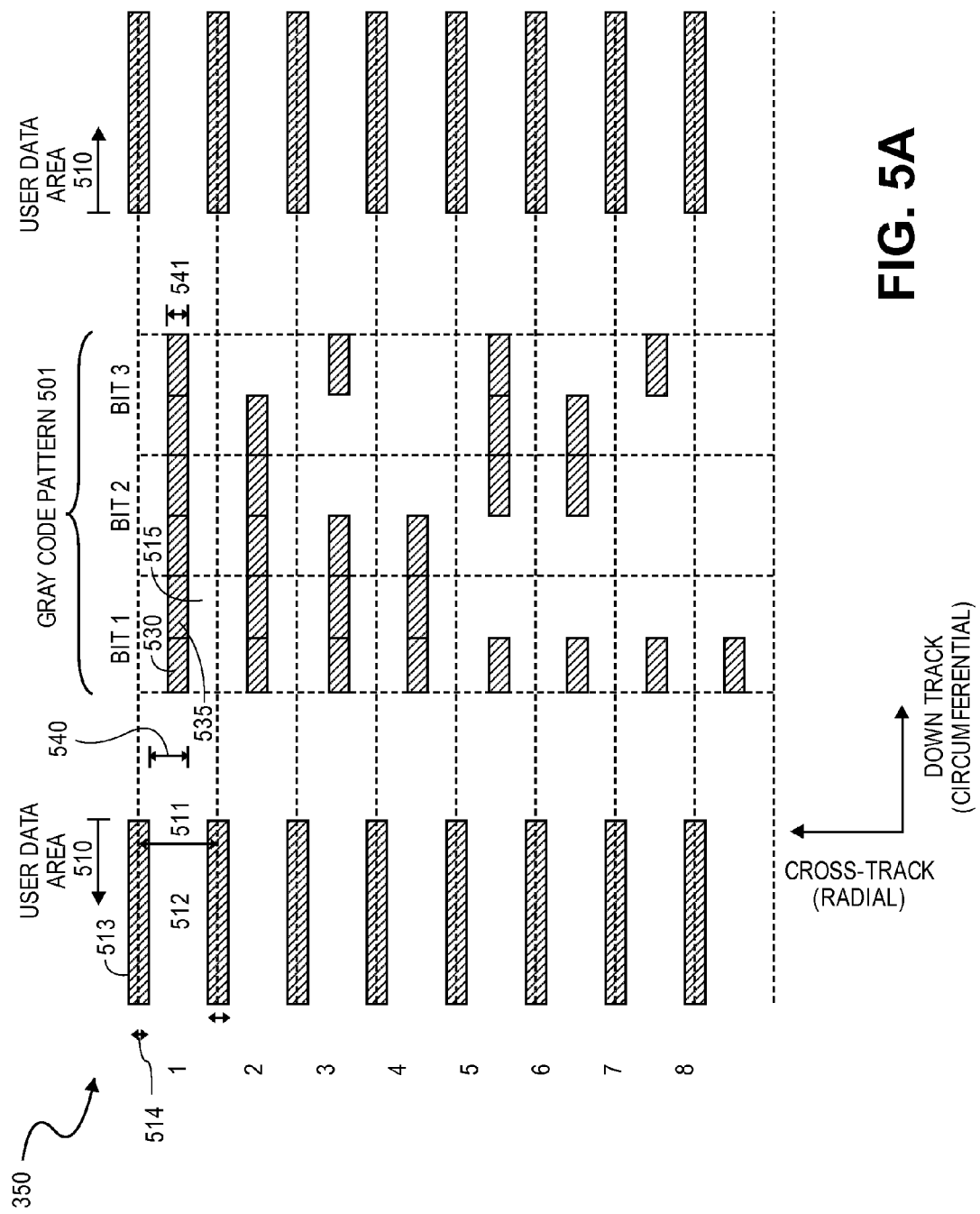
FIG. 5A is a plan view illustrating an expanded view of a portion of the magnetic media recording disk illustrated in FIG. 3 to show a gray code pattern according to one embodiment.

FIG. 5A is a plan view illustrating an expanded view of the portion 350 of the magnetic media recording disk illustrated in FIG. 3 to depict a gray code pattern according to one embodiment. Inserted within the user data area 510, is a gray code pattern 501. As shown, the user data area 510 includes eight data tracks demarked for illustration purposes by dashed lines in the down-track direction. The user data area 510 has a track pitch 511 including a magnetic region or land 512 and a non-recordable track space 513 with a cross-track width 514. Both the pitch and the ratio of cross-track width of the magnetic region 512 and non-recordable track space 513 may vary as known in the art. In exemplary embodiments, the non-recordable track space 513 has a cross-track width 514 equal to between 10% and 75% of the track pitch 511 for a recordable:non-recordable radial width ratio between 0.5 and 9. In the particular embodiment depicted in FIG. 5a, the cross-track width 514 is approximately 25% of the track pitch 511.

Generally, the gray code pattern 501 includes three bit cells demarked as Bit 1, Bit 2 and Bit 3. However, this exemplary 3-bit gray code pattern is readily adaptable to gray code patterns having more than three bits. Non-magnetic or magnetically suppressed regions, such as the non-magnetic or magnetically suppressed regions 530 and 533 are defined for each track, such as the track 1, with an offset from the user data area 510. Regions 530 and 533 are adjacent to magnetic regions 515. During operation of a disk drive system, a recording head flying over the gray code pattern 501 in a down-track direction detects shifted non-magnetic or magnetically suppressed regions 530 and 533 which cause a transition between the magnetic region 515 and the non-magnetic or magnetically suppressed regions 530 and 533. This transition may represent either a "1" or a "0."

In an embodiment, the non-magnetic or magnetically suppressed regions in the gray code pattern 501, such as the region 530 and 533 are shifted from the non-recordable region 513 in user data area 510 by a cross-track offset of less than the track pitch 511. In certain embodiments, as shown in FIG. 5A, each non-magnetic or magnetically suppressed region is consecutively shifted in the radial direction by an amount no greater than 50% of the track pitch 511. In the particular embodiment depicted in FIG. 5A, each non-magnetic or magnetically suppressed region is shifted in the radial direction by the cross-track distance 540, which is approximately 50% of the track pitch 511. As depicted, the region 530 spans a first down-track distance, in the circumferential direction, of Bit 1 and has a cross-track width less than the track pitch 511, while the region 535 spans a second down-track distance of Bit 1 and has a similar cross-track width as region 530.

In an embodiment, each non-magnetic or magnetically suppressed region of the gray code pattern 501 has a cross-track width or radial width less than the track pitch 511. In certain embodiments, each non-magnetic or magnetically suppressed region, such as the region 530 or 535, has a cross-track width 541 no greater than half the track pitch 511 for a recordable:non-recordable radial width ratio of at least 1:1. In the particular embodiment depicted in FIG. 5A, each non-magnetic or magnetically suppressed region has a cross-track width 541 equal to 25% of the track pitch 511 for a recordable:non-recordable radial width ratio of 3:1. In certain other embodiments, each non-magnetic or magnetically suppressed region within the gray code pattern 501 has a cross-track width 541 equal to that of the non-recordable track space 513 for a constant recordable:non-recordable radial width ratio between the gray code pattern 501 and the user data area 510.

Figure 5B:
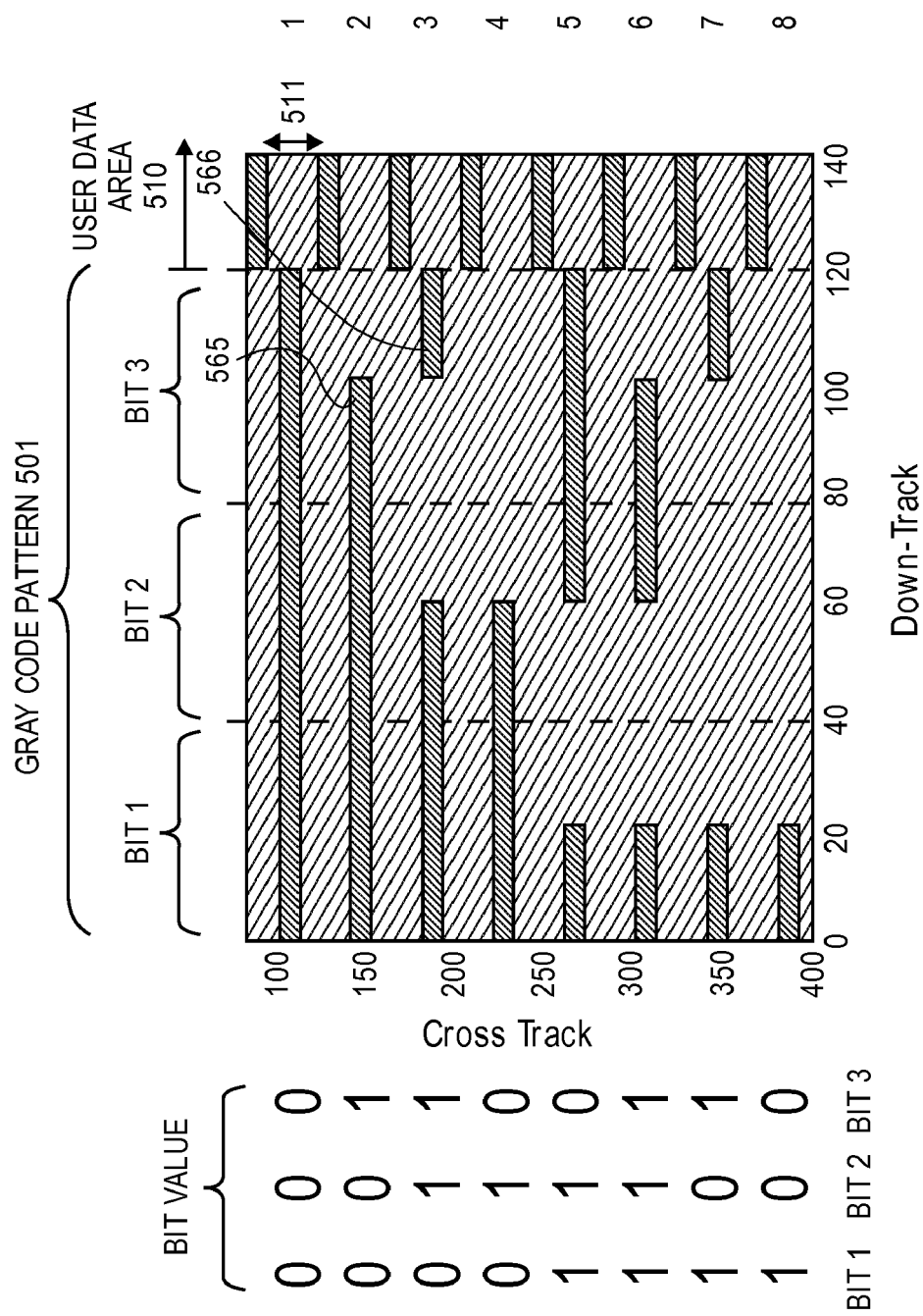
FIG. 5B is a plan view illustrating a gray code pattern with non-magnetic or magnetically suppressed regions having a cross-track width equal to 25% of the user data area track pitch with transitions between magnetic and non-magnetic or magnetically suppressed regions within a bit but not at the bit boundary, according to one embodiment according to one embodiment.
Figure 5C:
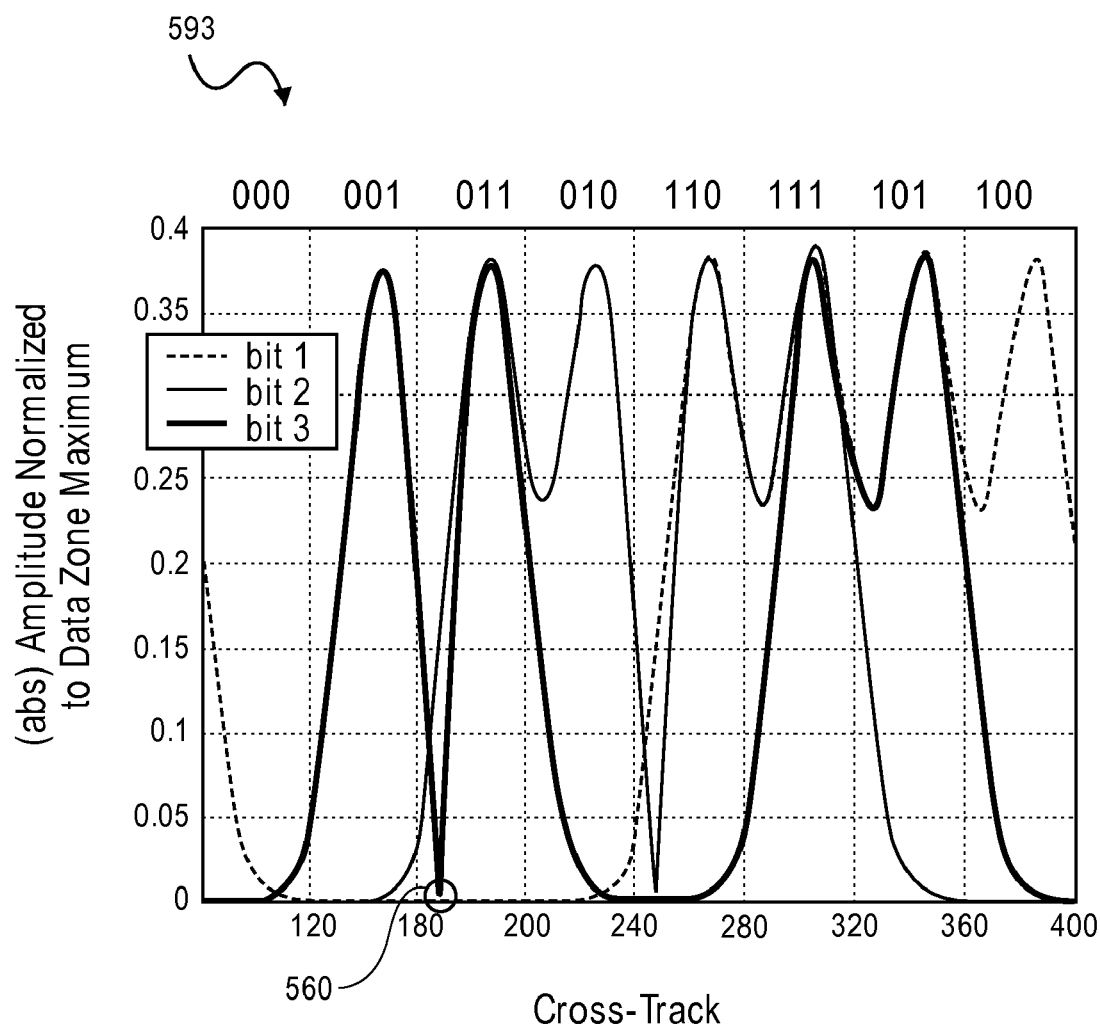
FIG. 5C is a graph illustrating read-back signals simulated for the gray code pattern illustrated in FIG. 5B.

In certain embodiments, such as that depicted in FIG. 5A and FIG. 5B, the gray code pattern includes transitions between magnetic and non-magnetic or magnetically suppressed regions within a bit cell but not at the boundary between bit cells. In particular embodiments, such as that depicted in FIG. 5A and FIG. 5B, a transition represents a "1" while a lack of a transition represents a "0." FIG. 5C shows a graph 593 illustrating rectified differential read-back signals as a function of cross-track position for the gray code pattern illustrated in FIG. 5B, which is similar to that depicted in FIG.

5A. In both FIGS. 5B and 5C, the values of Bit 1, Bit 2, and Bit 3 are shown for each track in the user data area 510, such as the track 1 through 8 of FIG. 5A. As shown in FIG. 5C, a strong signal is produced even through the cross-track width of the non-magnetic or magnetically suppressed regions in the gray code pattern 501 are approximately 25% of the track pitch 511. Of note is the discontinuity 560 which is attributable to a sign change occurring as a result of the physical positions of non-magnetic or magnetically suppressed regions 565 and 566 in this particular embodiment.

Figure 5D:
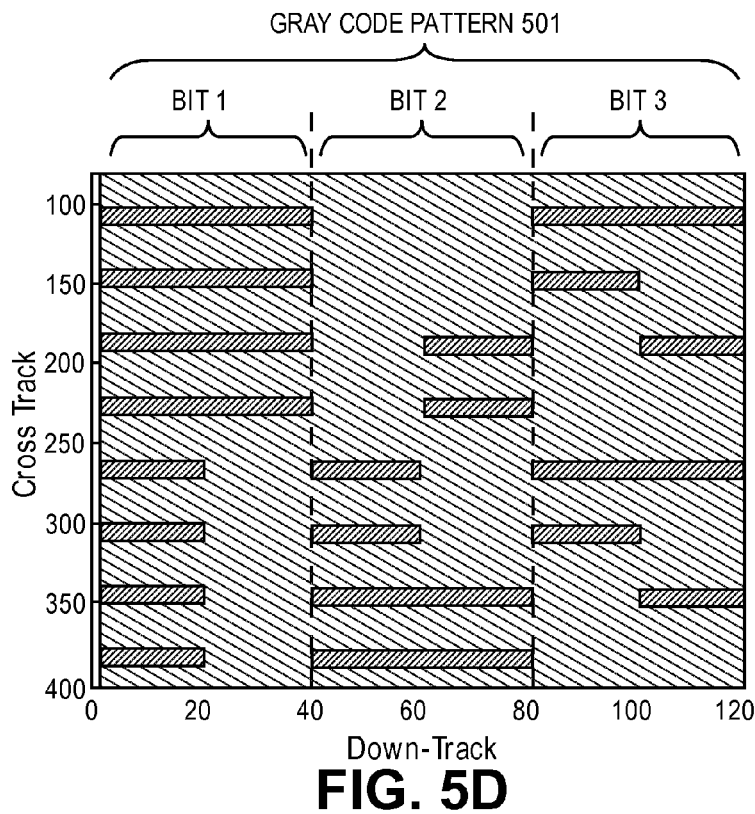
FIG. 5D is a plan view illustrating a gray code pattern comprised of non-magnetic or magnetically suppressed regions shifted by 50% of the user data area track pitch with transitions between magnetic and non-magnetic or magnetically suppressed regions at the bit boundary as well as within a bit, according to one embodiment.
Figure 5E:
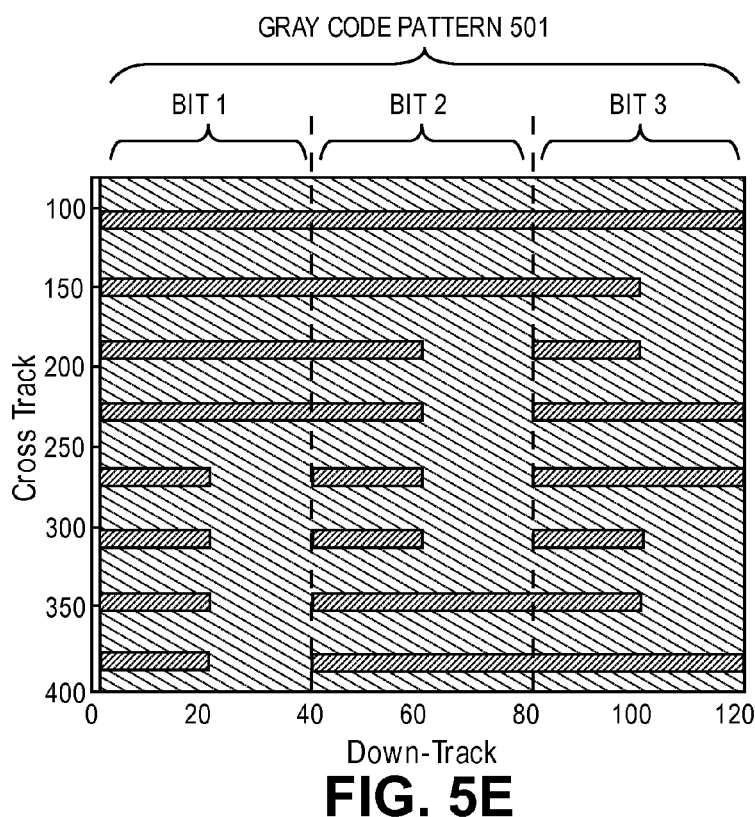
FIG. 5E is a plan view illustrating a gray code pattern comprised of segments shifted by 50% of the user data area track pitch with transitions between magnetic and non-magnetic or magnetically suppressed regions within a bit but and at the bit boundary, according to one embodiment.
Figure 5F:
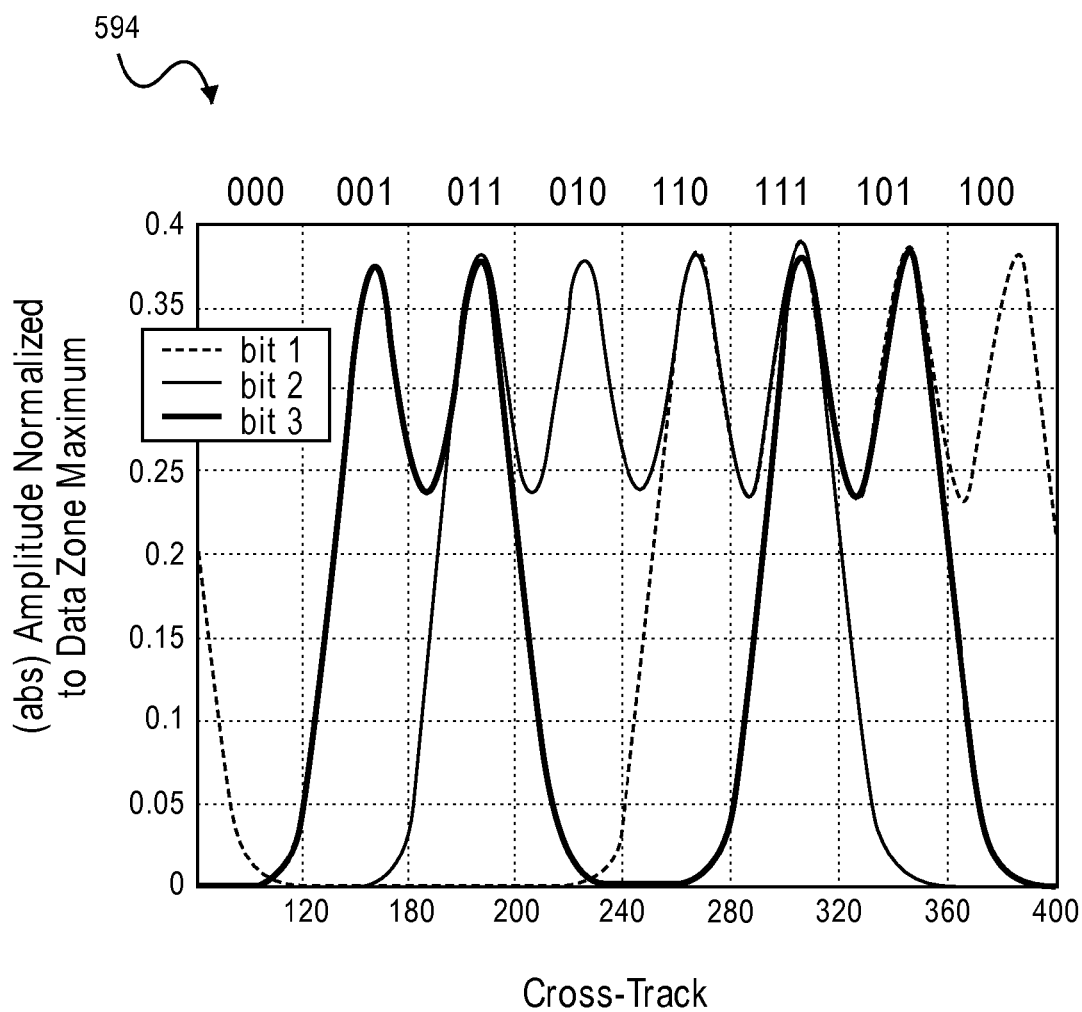
FIG. 5F is a graph illustrating read-back signals simulated for the gray code pattern illustrated in FIG. 5E.

In certain other embodiments, such as those depicted in FIG. 5D and FIG. 5E, the gray code pattern includes transitions between magnetic and non-magnetic or magnetically suppressed regions within a bit cell and between bit cells at the bit cell boundary. In particularly advantageous embodiments, such as that depicted in FIG. 5E, the sign change between adjacent tracks having the same bit value is avoided. Some of the advantages of such a gray code pattern embodiment are shown in the graph 594 of FIG. 5F illustrating read-back signals simulated for the gray code pattern of FIG. 5E. As shown, there is no discontinuity in any bit signal as the cross-track position changes.

Figure 5G:
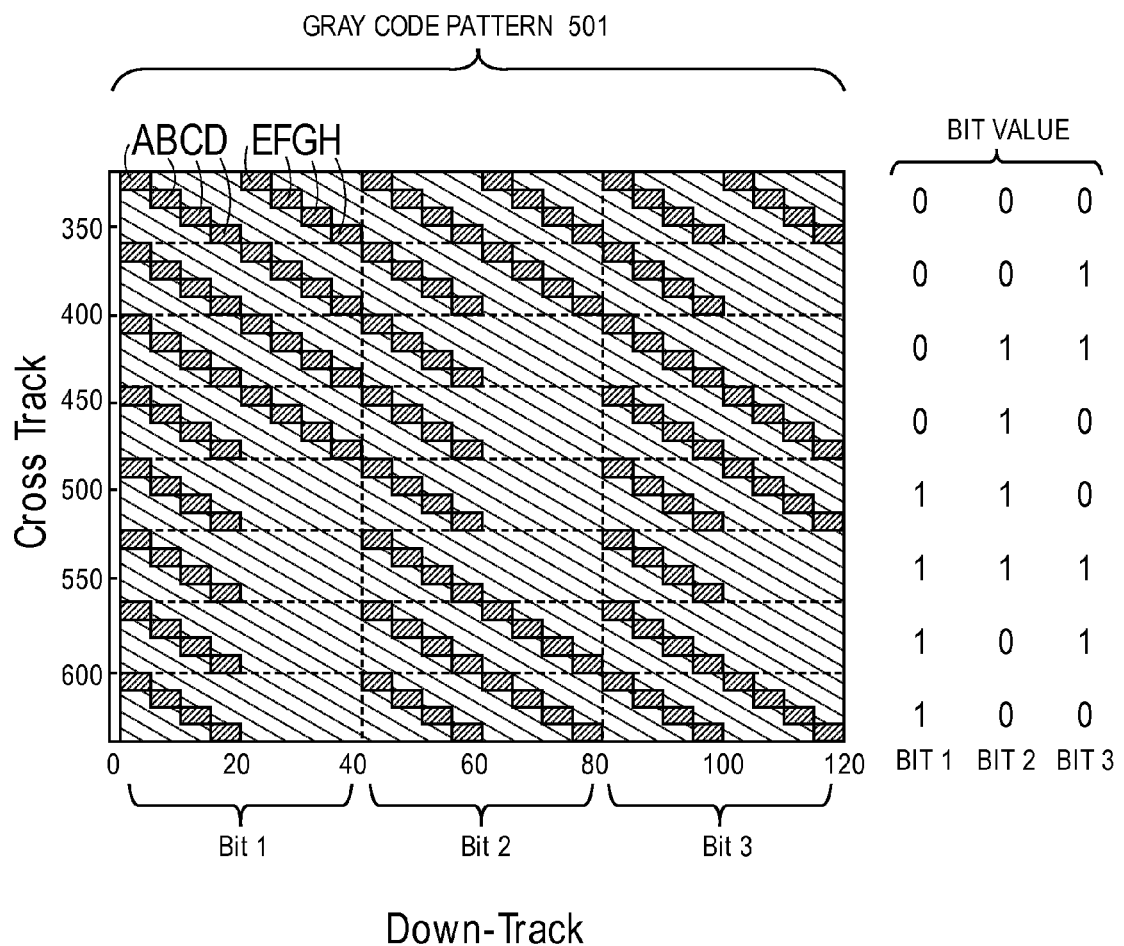
FIG. 5G is a plan view illustrating a gray code pattern comprised of non-magnetic or magnetically suppressed regions shifted by 25% of the user data area track pitch, according to one embodiment.
Figure 5H:
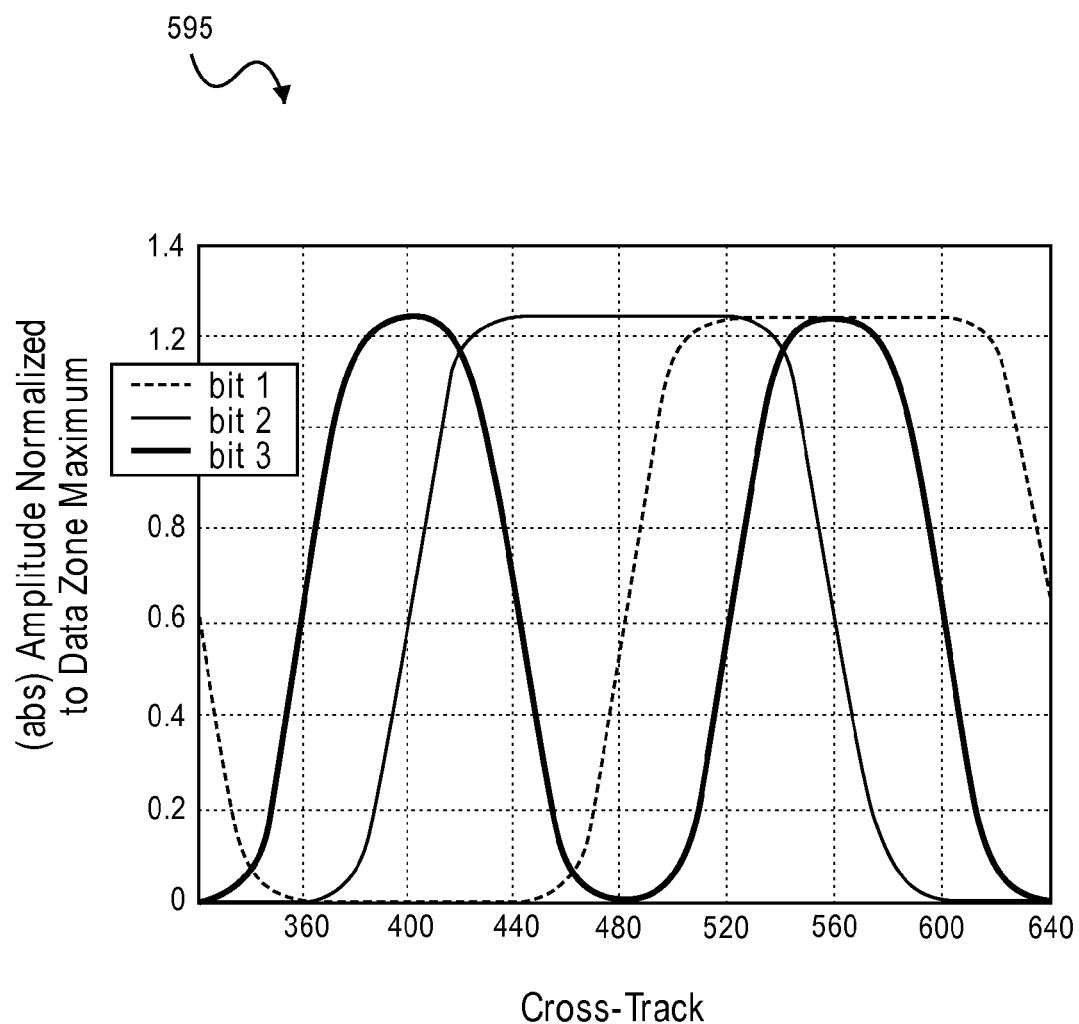
FIG. 5H is a graph illustrating read-back signals simulated for the gray code pattern illustrated in FIG. 5G.

FIG. 5G is a plan view illustrating a gray code pattern comprised of non-magnetic or magnetically suppressed regions shifted by 25% of the track pitch, according to another embodiment. As depicted, the horizontal dashed lines demark tracks and the vertical dashed lines demark inter-bit transitions. Generally, this gray code pattern is similar to that depicted in FIG. 5E. However, Bit 1, Bit 2 and Bit 3 each include non-magnetic or magnetically suppressed regions, such as the non-recordable regions A, B, C and D, having a relatively shorter down-track length (i.e. circumferential length). Intra-bit transitions are affected by either providing or not the additional non-magnetic or magnetically suppressed regions E, F, G and H which are staggered in a manner similar to regions A, B, C and D. In one embodiment, at least one of regions A, B, C and D have a down-track length equal to their cross-track width. Thus, in this particular embodiment, the gray code pattern 501 includes a non-magnetic or magnetically suppressed region, such as region B, having a cross-track width and down-track length equal to the cross-track width of the non-recordable region between tracks in the user data area and shifted by 25% of the track pitch. As shown in the graph 595 of FIG. 5H, an advantageously smooth and significantly stronger read-back signal is provided by the gray code pattern embodiment depicted in FIG. 5G.

Figure 6:
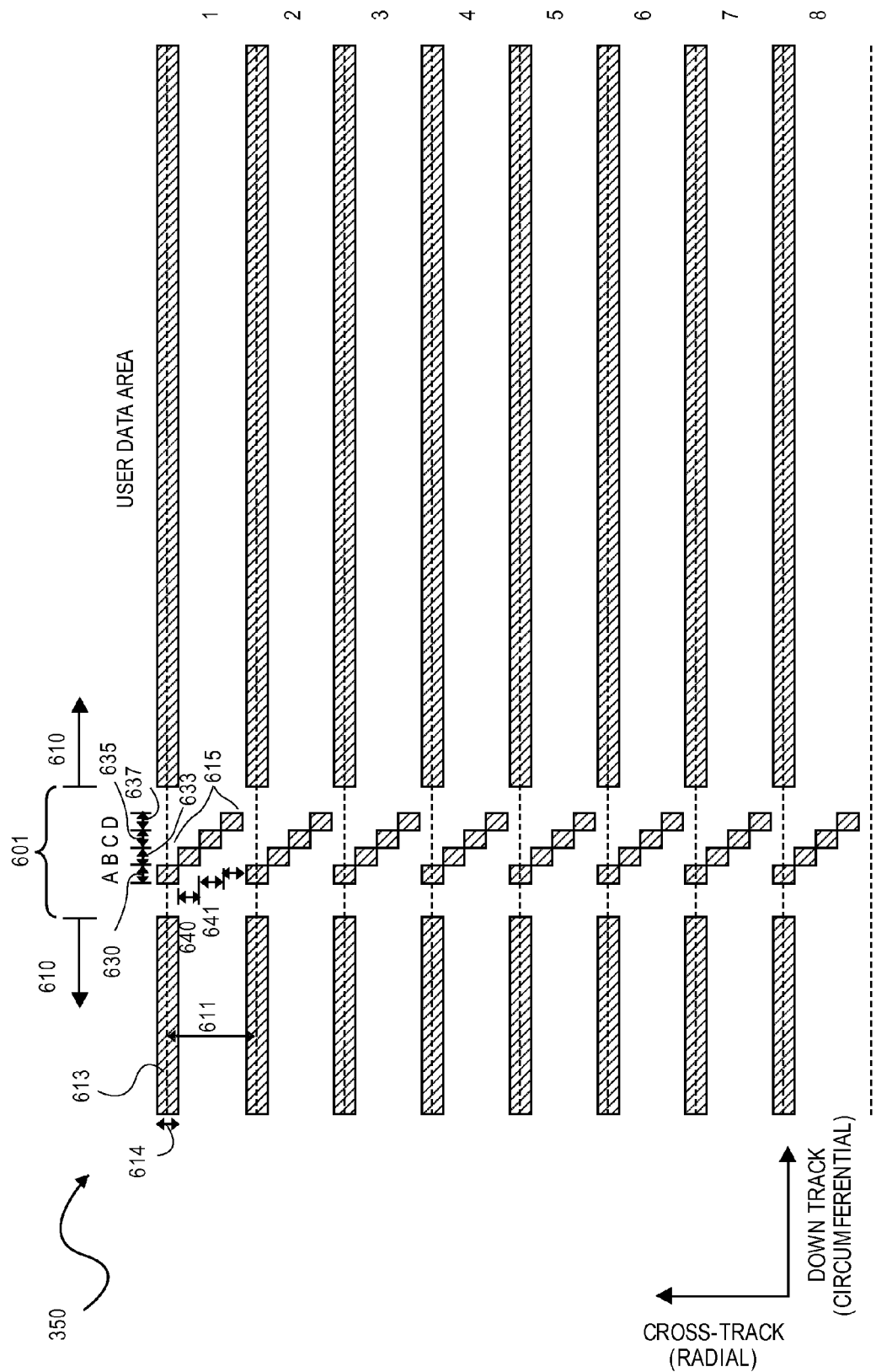
FIG. 6 is a plan view illustrating an expanded view of a portion of the magnetic media recording disk illustrated in FIG. 3 to show a timing line pattern according to one embodiment.

In still other embodiments, a timing line pattern is provided within a non-user data area. Such a timing line may have improved manufacturability and beneficial performance during operation of a disk drive system. FIG. 6 is a plan view illustrating an expanded view of the portion 350 of the magnetic media recording disk illustrated in FIG. 3 to show a timing line pattern according to one embodiment. Generally, as a head flies over the timing line pattern 601 during operation of a disk drive system, the staggered non-magnetic or magnetically suppressed regions A, B, C, D provide a detectable transition useful for timing of a read/write in the user data are 610. Various timing methods commonly known in the art may be performed in conjunction with the staggered timing line pattern depicted in FIG. 6.

As shown, the user data area 610 includes eight data tracks demarked for illustration purposes by dashed lines in the down-track direction. The non-recordable track space 513 has a cross-track width 614. Generally, the cross-track width 614 may be any desired width and typically anywhere from 5% to 75% of the track pitch 611, and is preferably less than 50% of the track pitch 611. In the particular embodiment depicted in FIG. 6, the cross-track width 614 of the non-recordable track space 513 is approximately 25% of the track pitch 611.

As depicted in FIG. 6, non-magnetic or magnetically suppressed regions A, B, C, D in the timing line pattern 601 are consecutively offset relative to the non-recordable track space 513 in the user data area 610 in a manner similar to certain embodiments of a gray code pattern and a servo pattern discussed elsewhere herein. In one embodiment, regions A, B, C and D are consecutively shifted by a cross-track offset of less than the track pitch 611. In certain embodiments, each non-magnetic or magnetically suppressed region is consecutively shifted by an amount no greater than 50% of the track pitch 611. In the particular embodiment depicted in FIG. 6, each non-magnetic or magnetically suppressed region is consecutively shifted by 25% of the track pitch 611. Thus, in the depicted embodiment, each non-recordable region is consecutively offset by an amount equal to the cross-track width 614 of the non-recordable track space 513 in the user data area.

As depicted, the region A spans a first down-track distance 630 has a cross-track width less than the track pitch 611 and is not offset in a cross-track direction from the user data area 610. The region B spans a second down-track distance 633, has the cross-track width 640 and is offset from the non-recordable region 613 in the user data area 610 by 25% of the track pitch 611 (or by 25% from the adjacent region A). The region C spans a third down-track distance 635, has the cross-track width 641 and is offset from the non-recordable region 613 by 50% of the track pitch 611 (or by 25% from the adjacent region B). Similarly, region D spans a fourth down track distance 637 and is offset from the noon-recordable region 613 by 75% of the track pitch 611 (or by 25% from the adjacent region C).

In an embodiment, each non-magnetic or magnetically suppressed region A, B, C and D has a cross-track width less than the track pitch 611. In certain embodiments, each non-magnetic or magnetically suppressed region has a cross-track width no greater than half the track pitch 611. In certain other embodiments, each region has a cross-track width (i.e. radial width) equal to the cross-track width 614 of the non-recordable track space 513. In the particular embodiment depicted in FIG. 6, each region has a cross-track width equal to 25% of the track pitch 611 for a recordable:non-recordable radial width ratio of 3:1 that is substantially equal to the 3:1 recordable:non-recordable radial width ratio in the user data area 610.

In one embodiment, the non-magnetic or magnetically suppressed regions A, B, C and D have a down-track length in the circumferential direction equal to their cross-track width. Thus, in this particular embodiment, the timing line pattern 601 includes a non-magnetic or magnetically suppressed region, such as region B, having a cross-track width 640 and down-track distance 633 equal to the cross-track width 614 and shifted by 25% of the track pitch 611. Embodiments employing regions A, B, C and D with a minimum down track length advantageously provide a rapid transition between the non-magnetic or magnetically suppressed regions and the surrounding magnetic region 615 to provide a smooth timing peak having an advantageously small half width at half maximum.

Methods to form physically pre-formatted patterns on a magnetic recording media are now described. Generally, any method commonly known in the art may be employed to physically pre-format the magnetic recording media with embodiments of the patterns described herein. For example, a physically pre-formatted pattern may include a non-magnetic region formed by etching away the magnetic media to form a trough. In another embodiment, a non-magnetic region may be formed by embedding a non-magnetic material in the magnetic media layer. In other embodiments, a magnetically suppressed region may be formed by implanting ions into the magnetic media to modify the coercivity. In still another embodiment, a magnetically suppressed region is a physically depressed magnetic media layer (e.g. a trough). Preformatting of the magnetic media typically employs at least one high resolution lithography operation which is the most time consuming and expensive operation of the magnetic disk manufacturing process. At least partly for this reason, a "family making process" is often employed to generate production stampers from a master mold.

Figure 7A:
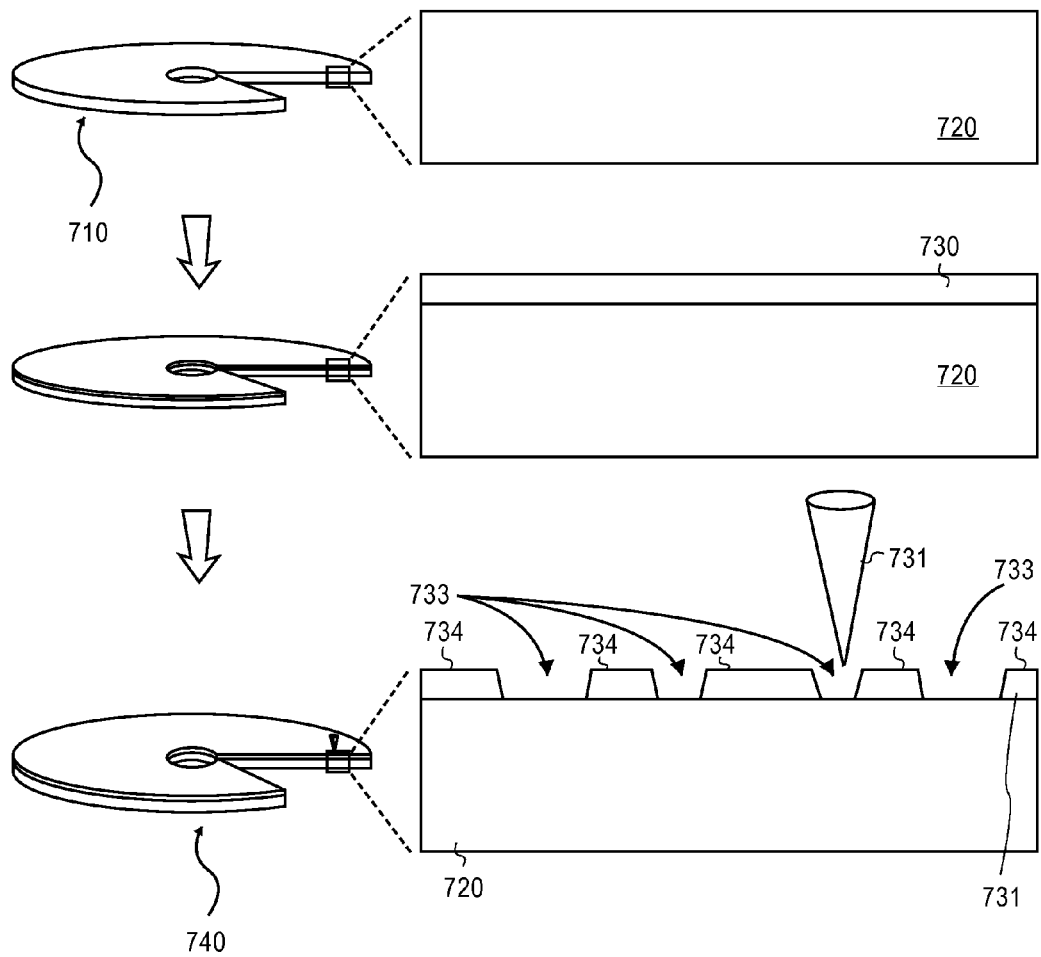
FIG. 7A is a cross-section view of depicting certain operations of a method for forming a physically preformatted pattern according to one embodiment.

FIG. 7A is a cross-section view depicting certain operations of a method for forming physically preformatted patterns according to one embodiment of the present invention. In this embodiment, a wafer formed into the shape of a disk 710 is used as the substrate 720 for a master template 740. The wafer may be made from various rigid materials, for examples, silicon, nickel, or glass. The substrate 720 is then coated with a masking layer 730, for example, by spin coating a photoresist or an electron sensitive resist. Alternatively, other coating methods (e.g., sputtering) and masking layer materials (e.g., dye polymer) may be used. Masking layers are known in the art; accordingly a detailed discussion is not provided.

In one embodiment, an electron beam (e-beam) mastering system is used to pattern the masking layer, for example, of electron beam-sensitive resist that has been coated on the substrate 720. E-beam master systems that may be used, for example, are manufactured by Nimbus of the U.K. and Obducat of Sweden. Alternatively, other e-beam mastering systems may be used. The e-beam 731 exposes the resist in certain areas 733. The exposed areas 733 of resist are then removed, for example, by chemical etching. This exposes bare substrate in the areas where the resist is removed. Alternatively, a self-developing e-beam process may be used whereby the masking layer 730 reacts to the electron beam to spontaneously develop in situ.

With particular embodiments of the patterns described herein having a substantially constant recordable:non-recordable radial width ratio between user data areas and non-user data areas (i.e. radial width of the non-recordable track space between tracks in the user data area is equal to the radial width of all non-recordable regions in the non-user data area), the e-beam mastering process may write continuously between a discrete track pattern in a user data area and various non-user data patterns such as, servo patterns, gray code patterns and timing line patterns. Thus, a concentric trough in the discrete track pattern of the user data area may be formed by the width of the e-beam spot while the down-track length is formed by electromechanically moving the stage and holding the electron beam in a first beam position incident to the substrate 720. Then to print a non-user data pattern offset in the cross-track direction from that particular track, the electron beam is electromagnetically deflected from the first beam position to a second beam position while continuing to electromechanically rotate circumferentially the stage to write the offset pattern in the down-track direction. Throughout this process, the e-beam spot size need not be changed. For particular embodiments where the non-recordable regions in the non-user data patterns have a cross-track width equal to the width of the non-recordable regions in the discrete track pattern of the user data area, the non-user data area can be written without a stitching of e-beam pixels within the track pitch 611 or across adjacent tracks. Since the e-beam writing process for a large master disk, such as an 85 mm disk, can take as long as a week, this ability to continuously write a single beam width through a given track is advantageously fast.

For the discrete track media, the pattern of the masking layer 730 after exposure and development will end up being the pattern desired to be embossed onto a patterned layer (e.g., a polymer) of a magnetic recording disk. The un-exposed areas 734 of the masking layer 730 ultimately create the magnetic regions (e.g. lands) on the embossed disk and the exposed areas 733 of masking layer 730 ultimately create the non-magnetic or magnetically suppressed regions (e.g. troughs) on the embossed disk.

Figure 7B:
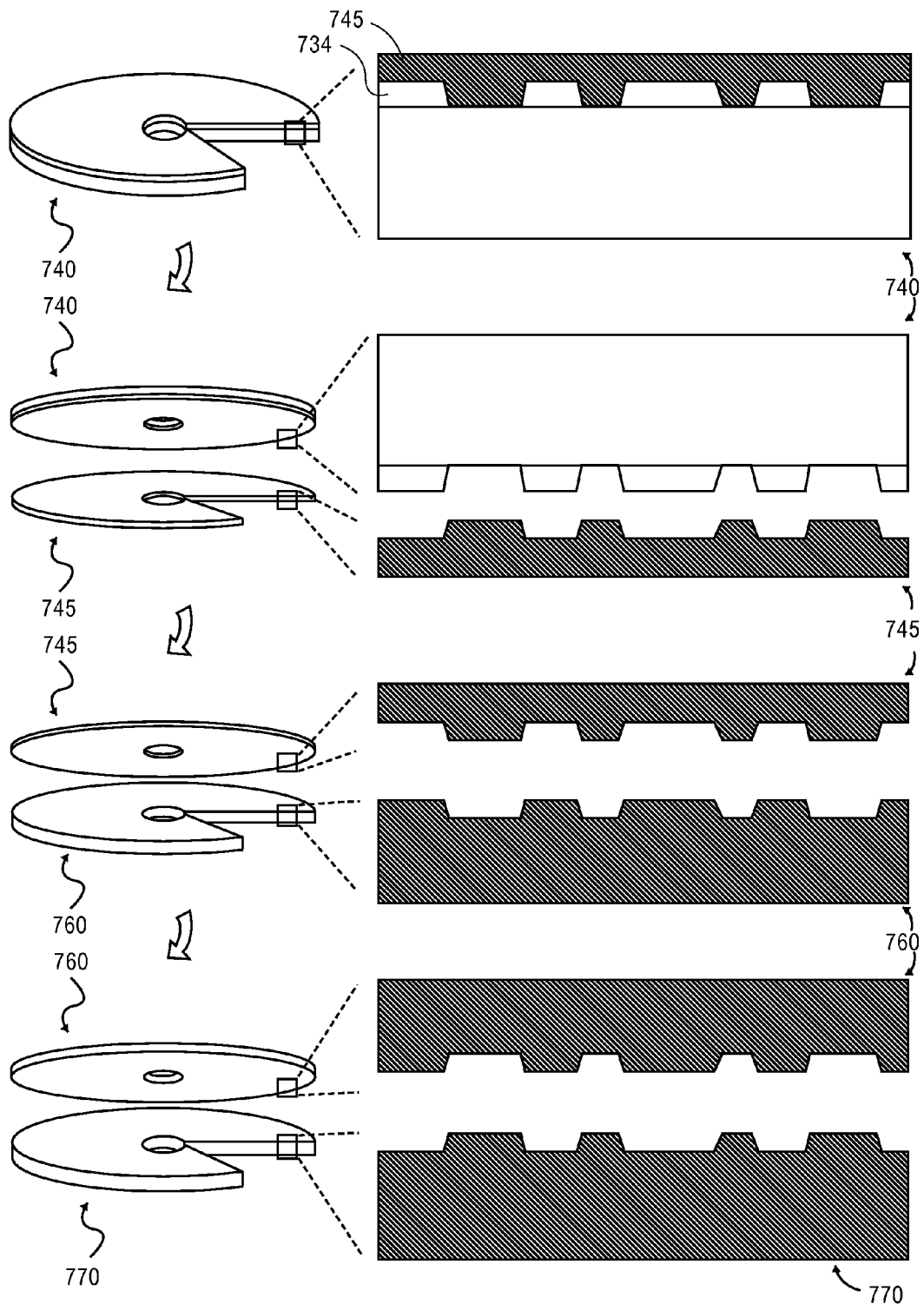
FIG. 7B is a cross-section view of depicting certain operations of a method for forming stamper templates having a preformatted pattern according to one embodiment.

FIG. 7B shows expanded cross sectional views illustrating one embodiment of manufacturing a production stamper from a master template. The master template 740 of FIG. 7A is used to generate a "father" template 745. The father template 745 is used to generate a "mother" template 760 that, in turn, is used to generate a production stamper ("son") 770 to emboss a disk. The father template 745 is generated by, for example, electroforming a layer (e.g., a NiP) on top of the masking layer 734 of the master template 740. In one embodiment, for example, NiP is plated onto the masking layer 734 of the master template 740. Alternatively, other metals or metal alloy materials may be used for the forming layer 745, for examples, chromium, copper, and nickel.

The forming layer 745 is separated from the master template 740 to create the father template 745 that is a negative impression of the master template. In one embodiment, the father template 745 may be used as the actual production stamper to emboss the patterned layer of the disk. Alternatively, the father template 745 is used to produce a production stamper by electroforming positive impressions (i.e., the mother templates 760) from the father 745 and then creating the production stampers ("sons") 770 from the mother template 760. Using this method, multiple production stampers can be grown from the father template 745. Each of these stamper generations provide a means to ultimately form the embodiments of the patterns described elsewhere herein.

In one embodiment, a discrete track pattern of the user data area along with a non-user data area including at least one of the patterns described elsewhere herein is embossed. A stamper, such as stamper 770 imprints a patternable layer disposed above a substrate of a recording disk. The patternable layer may be composed of a polymer. In one embodiment, for example, a polymer such as Ultem available from General Electric Corp., of Waterford N.Y. may be used. Alternatively, other imprintable materials may be used for the patternable layer, for examples, carbon and silica gel. In one embodiment, SOL-GEL available from General Electric Corp., of Waterford N.Y. may be used. Certain embodiments of the present invention provide good pathways for the patternable layer material to extrude during the embossing process, thereby improving the fidelity of the pattern transfer and increasing yield.

After the discrete track patterned layer is generated, additional layers such as a magnetic layer may be formed above the disk substrate to generate a magnetic recording disk, as commonly known in the art. In one embodiment, one or more layers may also be disposed between the patterned layer and magnetic layer (e.g., an underlayer and an intermediate layer). One or more layers may further be formed on top of the magnetic layer. For example, a protection layer may be deposited on top of the magnetic layer to provide sufficient property to meet tribological requirements such as CSS and corrosion protection. Predominant materials for the protection layer are carbon-based materials, such as hydrogenated or nitrogenated carbon. A lubricant may be placed on top of the protection layer to further improve tribological performance, for example, a perfluoropolyether or phosphazene lubricant.

Figure 8:
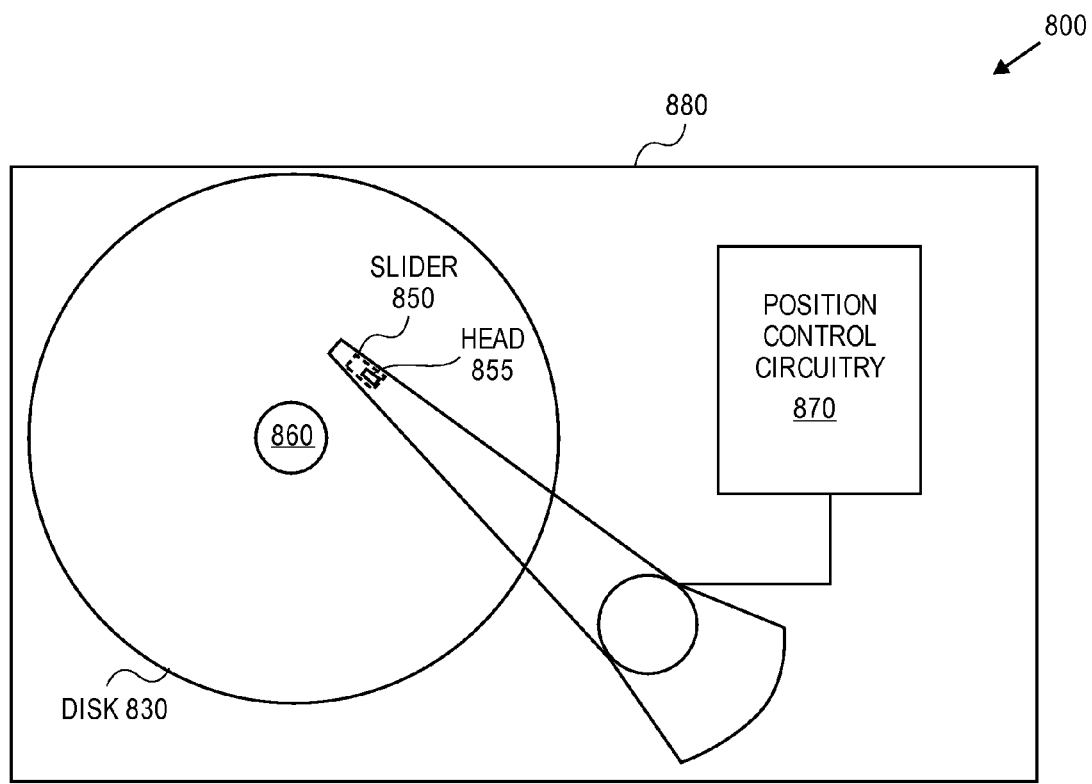
FIG. 8 is a schematic of a disk drive incorporating a discrete track magnetic recording media physically preformatted with a pattern according to one embodiment.

FIG. 8 illustrates a disk drive 800 having one or more magnetic media disk 830 including a physically pre-formatted pattern. In one embodiment, the disk 830 is physically preformatted such that across a given track pitch, a ratio of the radial width of recordable material to the radial width of non-recordable material in the user data area is approximately equal to a ratio of the radial width of recordable material to the radial width of non-recordable material in the non-user data area.

Data is read from and written to disk 830 using head 855 of slider 850. Head 855 includes both read and write elements. The write element is used to alter the properties of the longitudinal or perpendicular magnetic recording layer of disk 830. In one embodiment, head 855 may have a magneto-resistive (MR) and, in particular, a giant magneto-resistive (GMR) read element, and an inductive write element. In an alternative embodiment, head 855 may be another type of head, for example, a Hall effect head or an inductive head having a common element for both read and write operations.

Disk 830 resides on a spindle assembly 860 that is mounted to drive housing 880. The reading and writing of data is accomplished by flying the slider 850 over the surface of the disk 830 on a thin air bearing using a spindle motor (not shown) to rotate the spindle assembly 860 and, thereby, the disk 830. An actuator moves the head 350 along an arc to a desired track on the disk 230. The spindle motor rotates the disk 830 to position the head 855 at a particular location along the desired track. In particular embodiments, servo patterns, gray code patterns and timing line patterns in accordance with the present invention are employed to determine the position of the head 855 in conjunction with the position control circuitry 870.

In one embodiment, the head 855 is sized to have a leading edge that is at least one track pitch and less than 1.5× the track pitch. As used herein, the leading edge is with respect to the movement of a track on the disk 830. In an embodiment, when the leading edge flies over a non-recordable region on the disk 830, a first width of the leading edge of the head 855 is over a non-recordable region of a particular track while a second width of the leading edge of the head 855 is over a recordable region. For embodiments employing the pre-formatted information patterns disclosed elsewhere herein, when the leading edge flies over a non-recordable region on the disk 830, the ratio of the first width to the second width of the leading edge is substantially equal between user and non-user data areas. In other words, when the leading edge of the head is over a non-recordable region, the fraction of the leading edge over a non-recordable region is independent of whether the head 855 is flying over a user data area or over a non-user data area.

Although these embodiments have been described in language specific to structural features and/or methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. A magnetic recording media, comprising:
    a user data area with a track pitch and a non-recordable track space;
    a non-user data area including non-recordable regions, wherein each non-recordable region has a radial width that is no greater than a radial width of the non-recordable track space.

2. The magnetic recording media of claim 1, wherein the non-recordable regions comprise at least one of a servo pattern, a gray code pattern, and a timing line pattern.

3. A magnetic recording media, comprising:
    a user data area with a track pitch and a non-recordable track space;
    a non-user data area including non-recordable regions, wherein each non-recordable region has a radial width that is no greater than a radial width of the non-recordable track space, wherein the each non-recordable region in the non-user data area has a radial width substantially equal to the radial width of the track space; and wherein the non-user data area further comprises:
        a first non-recordable region having a first radial offset from the user data area, the first radial offset being less than the track pitch.

4. The magnetic recording media of claim 3, wherein the first non-recordable region has a radial offset from the user data area equal to the radial width of the track space.

5. The magnetic recording media of claim 4, further comprising:
    a second non-recordable region having a radial width equal to the first non-recordable region and having a second radial offset from the user data area that is less than the track pitch and greater than the first radial offset.

6. The magnetic recording media of claim 5, wherein the first non-recordable region spans a different circumferential distance than the second non-recordable region, the first region has a radial offset of 25% of the track pitch, the second region has a radial offset of 50% of the track pitch and wherein each region has a radial width between 25% and 50% of the track pitch.

7. The magnetic recording media of claim 6, further comprising a third and a fourth non-recordable region, the third non-recordable region having a radial offset of 75% of the track pitch and the fourth non-recordable region having no radial offset, wherein the third and fourth region each have a radial width between 25% and 50% of the track pitch.

8. The magnetic recording media of claim 3, wherein the first non-recordable region spans a first circumferential distance in a gray code area, and is offset, in a radial direction, by 50% of the track pitch of the user data area and having a radial width of between 25% and 50% of the track pitch.

9. The magnetic recording media of claim 8, wherein the first non-recordable region defines a transition representing a "1" within a bit cell for a first track of the user data area.

10. The magnetic recording media of claim 8, wherein the first non-recordable region represents a boundary between bit cells.

11. A method of fabricating a magnetic recording media, comprising:
    physically pre-formatting the magnetic recording media with a user data area with a track pitch and a non-recordable track space; and
    physically pre-formatting the magnetic recording media with a non-user data area including non-recordable regions, wherein each non-recordable region has a radial width that is no greater than a radial width of the non-recordable track space and wherein a first non-recordable region has a first radial offset from the user data area that is less than the track pitch.

12. The method of fabricating a magnetic recording media of claim 11, wherein the first non-recordable region is physically pre-formatted to have a radial width between 25% and 50% of the track pitch of the user data area.

13. The method of fabricating a magnetic recording media of claim 12, wherein the first non-recordable region is physically-preformatted to have a radial width equal to a radial width of the non-recordable track space.

14. The method of fabricating a magnetic recording media of claim 11, further comprising:
   physically pre-formatting a second non-recordable region to have a radial width equal to the first non-recordable region and having a second radial offset from the user data area that is less than the track pitch and greater than the first radial offset.

15. The method of fabricating a magnetic recording media of claim 11, wherein physically pre-formatting the first non-recordable region further comprises:
   providing a masked magnetic media;
      forming the first non-recordable region by selectively etching the masked magnetic media.

16. The method of fabricating a magnetic recording media of claim 11, wherein physically pre-formatting the first non-recordable region further comprises:
   embossing a masked substrate with a stamper, the stamper further including a negative replica of the user data area.

17. A stamper, comprising:
   a substrate having a stamper pattern comprising:
   a discrete track pattern with a track pitch and a track space; and
   a control sector pattern including recessed regions, the recessed regions wherein each recessed region has a radial width that is no greater than a radial width of the track space and wherein a first recessed region is offset in the radial direction from the discrete track pattern by less than the track pitch.

18. The stamper of claim 17, wherein the first recessed region has a radial width equal to a radial width of the track space.

19. A method of fabricating a stamper, comprising
   providing a substrate having a surface;
   forming a masking layer on the substrate; and
   forming in the masking layer a stamper pattern comprising:
   a discrete track pattern with a track pitch and a track space; and
   a control sector pattern including recessed regions, each recessed region having a radial width that is no greater than a radial width of the track space and wherein a first recessed region is offset in the radial direction from the discrete track pattern by less than the track pitch.

20. The method of claim 19, wherein the stamper pattern is formed using an electron beam.

21. The method of claim 20, further comprising:
   affixing the substrate to a stage operatively coupled to the electron beam;
   defining a circumferential length of the track space by mechanically moving the stage while the electron beam is held in a first beam position incident to the substrate, the width of the electron beam defining a radial width of the track space;
   offsetting the first recessed region by no greater than the track pitch by electromagnetically deflecting the electron beam from the first beam position to a second beam position while defining a circumferential length of the first recessed region by mechanically moving the stage.

22. A disk drive, comprising:
   a magnetic recording disk, comprising:
      a user data area having a track pitch and a non-recordable track space;
      a non-user data area including non-recordable regions, wherein each non-recordable region has a radial width that is no greater than a radial width of the non-recordable track space; and
   a head having a magneto-resistance read element operatively coupled to the magnetic recording disk.

23. A disk drive, comprising:
   a magnetic recording disk, comprising:
      a user data area having a track pitch and a non-recordable track space;
      a non-user data area including non-recordable regions, wherein each non-recordable region has a radial width that is no greater than a radial width of the non-recordable track space, wherein a first non-recordable region has a first radial offset from the user data area that is equal to the track space; and
   a head having a magneto-resistance read element operatively coupled to the magnetic recording disk.

24. A disk drive, comprising:
   a magnetic recording disk, comprising:
      a user data area having a track pitch and a non-recordable track space;
      a non-user data area including non-recordable regions, wherein each non-recordable region has a radial width that is no greater than a radial width of the non-recordable track space, wherein each non-recordable region has a radial width substantially equal to the non-recordable track space in the user data area; and
   a head having a magneto-resistance read element operatively coupled to the magnetic recording disk.

25. The disk drive of claim 24, wherein the head has a leading edge and, when the leading edge is over a non-recordable region, the fraction of the leading edge over the non-recordable region is substantially independent of whether the non-recordable region is located in the user data area or the non-user data area.

* * * * *